United States Patent
Yong

(10) Patent No.: US 10,313,235 B2
(45) Date of Patent: Jun. 4, 2019

(54) INTERNET CONTROL MESSAGE PROTOCOL ENHANCEMENT FOR TRAFFIC CARRIED BY A TUNNEL OVER INTERNET PROTOCOL NETWORKS

(71) Applicant: Futurewei Technologies, Inc., Plano, TX (US)

(72) Inventor: Lucy Yong, Georgetown, TX (US)

(73) Assignee: Futurewei Technologies, Inc., Plano, TX (US)

( * ) Notice: Subject to any disclaimer, the term of this patent is extended or adjusted under 35 U.S.C. 154(b) by 217 days.

(21) Appl. No.: 15/208,347

(22) Filed: Jul. 12, 2016

(65) Prior Publication Data

US 2017/0019331 A1    Jan. 19, 2017

Related U.S. Application Data

(60) Provisional application No. 62/191,896, filed on Jul. 13, 2015.

(51) Int. Cl.
| | |
|---|---|
| *H04L 12/715* | (2013.01) |
| *H04L 12/46* | (2006.01) |
| *H04L 12/723* | (2013.01) |
| *H04L 12/707* | (2013.01) |

(52) U.S. Cl.
CPC .......... *H04L 45/64* (2013.01); *H04L 12/4633* (2013.01); *H04L 45/22* (2013.01); *H04L 45/50* (2013.01)

(58) Field of Classification Search
CPC ............................. H04L 45/64; H04L 12/4633
See application file for complete search history.

(56) References Cited

U.S. PATENT DOCUMENTS

| | | | |
|---|---|---|---|
| 2003/0018800 A1* | 1/2003 | Paila | H04H 20/26 709/232 |
| 2007/0112975 A1* | 5/2007 | Cassar | H04L 29/12933 709/239 |

(Continued)

OTHER PUBLICATIONS

Herbert, T., et al., "Generic UDP Encapsulation," draft-ietf-nvo3-gue-04, Jul. 6, 2016, 31 pages.

(Continued)

*Primary Examiner* — Zhensheng Zhang
(74) *Attorney, Agent, or Firm* — Conley Rose, P.C.

(57) ABSTRACT

A first network element (NE) comprises a receiver configured to receive a tunnel redirection request message from a second NE, wherein the tunnel redirection request message is a request to re-route packets to a third NE instead of the second NE, wherein the tunnel redirection request message comprises an address of the third NE and a first destination address, wherein the packets comprise the first destination address. A processor of the NE is coupled to the receiver and configured to add an outer header and an encapsulation header to a first subset of the packets, wherein the outer header comprises the address of the third NE, and wherein the encapsulation header comprises an identifier of an encapsulation protocol supported by the third NE, and a transmitter coupled to the processor and configured to transmit the first subset of the packets to the third NE via an overlay tunnel, and transmit a second subset of packets to the second NE.

20 Claims, 15 Drawing Sheets

(56) References Cited

U.S. PATENT DOCUMENTS

2014/0086253 A1* 3/2014 Yong ................... H04L 12/4633
370/395.53
2017/0063678 A1* 3/2017 Rasanen ............. H04L 41/5054

OTHER PUBLICATIONS

Braden, R., Ed., "Requirements for Internet Hosts—Communication Layers," RFC 1122, Oct. 1989, 116 pages.
Conta, A., et al., "Internet Control Message Protocol (ICMPV6) for the Internet Protocol Version 6 (IPv6) Specification," RFC 4443, Mar. 2006, 24 pages.
Narten, T., et al., "Neighbor Discovery for IP version 6 (IPv6)," RFC 4861, Sep. 2007, 97 pages.
Mahalingam, M., et al., "Virtual eXtensible Local Area Network (VXLAN) : A Framework for Overlaying Virtualized Layer 2 Networks Over Layer 3 Netowrks," RFC 7348, Aug. 2014, 22 pages.
Lasserre, M., et al., "Framework for Data Center (DC) Network Virtualization," RFC 7365, Oct. 2014, 26 pages.
Xu, X., et al., "Encapsulating MPLS in UDP," RFC 7510, Apr. 2015, 19 pages.

* cited by examiner

300

```
ICMP Redirect:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = 5   |     Code      |         Header checksum       |
+-+-+-+-+-+-+-+-+-+-+-+-+-+-+-+-+-+-+-+-+-+-+-+-+-+-+-+-+-+-+-+-+
|                          IPv4 Address                          |
+-+-+-+-+-+-+-+-+-+-+-+-+-+-+-+-+-+-+-+-+-+-+-+-+-+-+-+-+-+-+-+-+
|      IP header and first 8 bytes of original datagram's data   |
+-+-+-+-+-+-+-+-+-+-+-+-+-+-+-+-+-+-+-+-+-+-+-+-+-+-+-+-+-+-+-+-+
```

FIG. 3

INTERNET CONTROL MESSAGE PROTOCOL ENHANCEMENT FOR TRAFFIC CARRIED BY A TUNNEL OVER INTERNET PROTOCOL NETWORKS

CROSS-REFERENCE TO RELATED APPLICATIONS

The present application claims priority to U.S. Provisional Patent Application 62/191,896, filed Jul. 13, 2015 by Lucy Yong, and entitled "Internet Control Message Protocol Enhancement for Traffic Carried by a Tunnel over Internet Protocol Networks", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer virtualization has dramatically and quickly changed the information technology (IT) industry in terms of efficiency, cost, and the speed in providing new applications and/or services. The trend continues to evolve towards network virtualization, where a set of virtual machines (VMs) or servers may communicate in a virtual network environment that is decoupled from the underlying physical networks in a data center (DC). An overlay virtual network is one approach to provide network virtualization services to a set of VMs or servers. An overlay virtual network may enable the construction of many virtual tenant networks on a common network infrastructure, where each virtual tenant network may have independent address space, independent network configurations, and traffic isolation among each other, which are all decoupled from the underlying network infrastructure. In addition, an overlay virtual network may support migrations of VMs since there is no longer a physical network limitation. Further, an overlay virtual network may speed up the configuration of multi-tenant cloud applications and virtual DCs, leading to potential new DC applications, such as a software defined DC.

An overlay virtual network may provide communication among a set of tenant systems (TSs), where TSs may be VMs on a server or physical servers. An overlay virtual network may provide Layer 2 (L2) or Layer 3 (L3) services to the connected TSs via network virtualization edges (NVEs), where NVEs may be implemented as part of a virtual switch within a hypervisor, and/or physical switch or router. An NVE encapsulates ingress tenant traffic and sends the encapsulated traffic over a tunnel across an underlying network toward an egress NVE. An egress NVE at the tunnel remote end point decapuslates the traffic prior to delivering the original data packet to the appropriate TS. There are a number of encapsulation protocols available in the industry today, such as virtual eXtensible Local Area Network (VX-LAN) encapsulation, Microsoft's Network Virtualization over Generic Routing Encapsulation (NVGRE), and Internet Protocol (IP) Generic Routing Encapsulation (GRE), and other encapsulation protocols.

The Internet Control Message Protocol (ICMP) is one of the main protocols of the internet protocol suite, as defined by Internet Engineering Task Force (IETF) Request For Comments (RFC) 792 titled, "INTERNET CONTROL MESSAGE PROTOCOL," by J. Postel published in September 1981, which is hereby incorporated by reference in its entirety. ICMP is used by network devices, like routers, to send error messages indicating, for example, that a requested service is not available or that a host or router could not be reached. ICMP can also be used to relay query messages.

SUMMARY

The current ICMP protocol cannot be used for overlay traffic or tunnel packet transmissions because the current ICMP protocol does not have visibility of overlay protocols or tunnel payloads. Therefore, current ICMP redirect request messages cannot redirect overlay traffic and cannot redirect traffic via a tunnel. Current ICMP protocol also cannot be used by a tunnel to facilitate tunnel transport over networks. Disclosed herein are various embodiments for enhancing the ICMP protocol to allow a first router to redirect traffic via a tunnel and redirect some overlay traffic to terminate on a second router instead of the first router, while continuing to allow other overlay traffic to be terminated at the first router.

In one example embodiment, the disclosure includes a method for providing communication over an overlay virtual network implemented by a first network element (NE), comprising receiving a tunnel redirection request message from at least one of a second NE and a Network Controller, wherein the tunnel redirection request message is a request to re-route a first subset of subsequent packets to a third NE, wherein the tunnel redirection request message comprises an address of the third NE, and wherein the first subset of subsequent packets are overlay network packets, encapsulating the first subset of subsequent packets to form a plurality of first encapsulated packets, wherein each of the first encapsulated packets comprise a first outer header, and wherein the outer header comprises the address of the third NE, forwarding the first encapsulated packets to the third NE via a first overlay tunnel, encapsulating a second subset of subsequent packets to form a plurality of second encapsulated packets, wherein each of the second encapsulated packets comprises a second outer header, and wherein the second outer header comprises an address of the second NE, and forwarding the second encapsulated packets to the second NE via a second overlay tunnel, wherein the second encapsulated packets are overlay network packets. In some embodiments, the disclosure also includes further comprising establishing the first overlay tunnel between the first NE and the third NE, and/or wherein the first subset of subsequent packets are transmitted via an overlay network, wherein the tunnel redirection request message further comprises a virtual network identifier (VNID) and a prefix, and wherein encapsulating the first subset of subsequent packets further comprises setting the outer header of the first subset of subsequent packets to be the address of the third NE when the first subset of subsequent packets comprise at least one of the VNID and the prefix, and/or further comprising receiving a tunnel capability message from the third NE, wherein the tunnel capability message comprises at least one of a tunnel encapsulation type supported by the third NE, a tunneled payload type of the third NE, a checksum capability of the third NE, and an offload capability of the third NE, and/or further comprising sending a tunnel operations message to the third NE, wherein the tunnel operations message identifies an operation for the third NE to perform, and/or wherein the first subset of subsequent packets are encapsulated according to at least one encapsulation protocol consisting of virtual eXtensible Local Area Network (VXLAN), multiprotocol label switching (MPLS), user datagram protocol (UDP), generic UDP encapsulation (GUE), and service function chaining encapsulation (SFC).

In another embodiment, the disclosure includes, a first NE implemented as a NVE, comprising a receiver configured to receive a tunnel redirection request message from a second NE or a network controller, wherein the tunnel redirection request message is a request to re-route a first subset of subsequent packets to a third NE, wherein the tunnel redirection request message comprises an address of the third NE, and wherein the first subset of subsequent packets are IP packets, a processor coupled to the receiver and configured to encapsulate the first subset of subsequence packets to form a plurality of encapsulated packets, wherein each of the encapsulated packets comprises an outer header, and wherein the outer header comprises the address of the third NE, and a transmitter coupled to the processor and configured to forward the encapsulated packets to the third NE, and forward a second subset of subsequent packets to the second NE via a path of an IP network, wherein the second subset of subsequent packets are IP packets. In some embodiments, the disclosure further includes further comprising sending a tunnel operations message to the third NE, wherein the tunnel operations message is a request for a tunnel capability message from the third NE, and/or wherein the tunnel capability message comprises at least one of a supported tunnel encapsulation type of the third NE, a tunneled payload type of the third NE, a checksum capability of the third NE, an offload capability of the third NE, and/or wherein the first subset of subsequent packets are transmitted via an underlying network, and wherein the processor is further configured to identify the encapsulation protocol supported by the first NE and the third NE, encapsulate the first subset of subsequent packets according to the encapsulation protocol, and establish the overlay tunnel between the first NE and the third NE, and/or wherein the first NE, the second NE, and the third NE are routers.

In an embodiment, the disclosure includes a method providing communication over a tunnel implemented by a first NE, comprising receiving a tunnel redirection request message from a second NE, wherein the tunnel redirection request message is a request to re-route packets to a third NE, wherein the tunnel redirection request message comprises an address of the third NE, and wherein the packets are at least one of IP packets and overlay network packets, adding an outer header to each of a first subset of the packets, wherein the outer header comprises the address of the third NE, transmitting the first subset of the packets to the third NE via an overlay tunnel after adding the outer header to the packets, wherein the first subset of the packets are overlay network packets, and transmitting a second subset of the packets to the second NE, wherein the second subset of the packets are at least one of IP packets and overlay network packets. In some embodiments, the disclosure further includes further comprising receiving a tunnel capability message from the third NE, wherein the tunnel capability message comprises properties of the third NE and properties of overlay traffic between the first NE and the third NE, and/or wherein the first destination address is a media access control (MAC) addresses of a tenant system to which the encapsulated packets are destined to, and/or wherein the address of the third NE is an IP address, wherein the tunnel redirection request message comprises at least one of a code, a tunnel type, a tunnel egress address, a traffic IP address, a VNID, and a traffic address, and/or further comprising receiving a tunnel operations message from the third NE, wherein the tunnel operations message requests the first NE to filter packets of a certain type such that the third NE does not receive them, and preventing the packets of the certain type from being forwarded to the third NE in response to receiving the tunnel operations message, and/or wherein the first subset of the packets are the IP packets and are transmitted via an underlying network, wherein the method further comprises establishing the overlay tunnel between the first NE and the third NE, and wherein the transmitter is further configured to forward the first subset of the packets to the third NE via the overlay tunnel, wherein the first subset of the packets are the overlay network packets and are transmitted via an overlay network, wherein the tunnel redirection request message further comprises a VNID and a prefix, and wherein the method further comprises setting the outer header of the first subset of the packets to be the address of the third NE when the first subset of the packets comprise at least one of the VNID and the prefix, and/or further comprising storing a tunnel routing table and a tunnel properties table, wherein the tunnel routing table indicates an entry for a tunneled path between a source tenant system and a destination tenant system, and wherein the tunnel properties table includes an entry identifying properties for each of the first NE, the second NE, and the third NE.

In an embodiment, the disclosure includes a first NE implemented as an NVE, comprising a receiver configured to receive a tunnel operation message from a second NE via an overlay tunnel, wherein the tunnel operation message is a request for a plurality of capabilities and properties of the first NE, and a transmitter configured to send a tunnel capability message to the second NE in response to receiving the tunnel operation message via the overlay tunnel, wherein the tunnel capability message includes the capabilities and properties of the first NE.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a schematic diagram of an embodiment of an ICMP redirect message.

DETAILED DESCRIPTION

Figure 1:
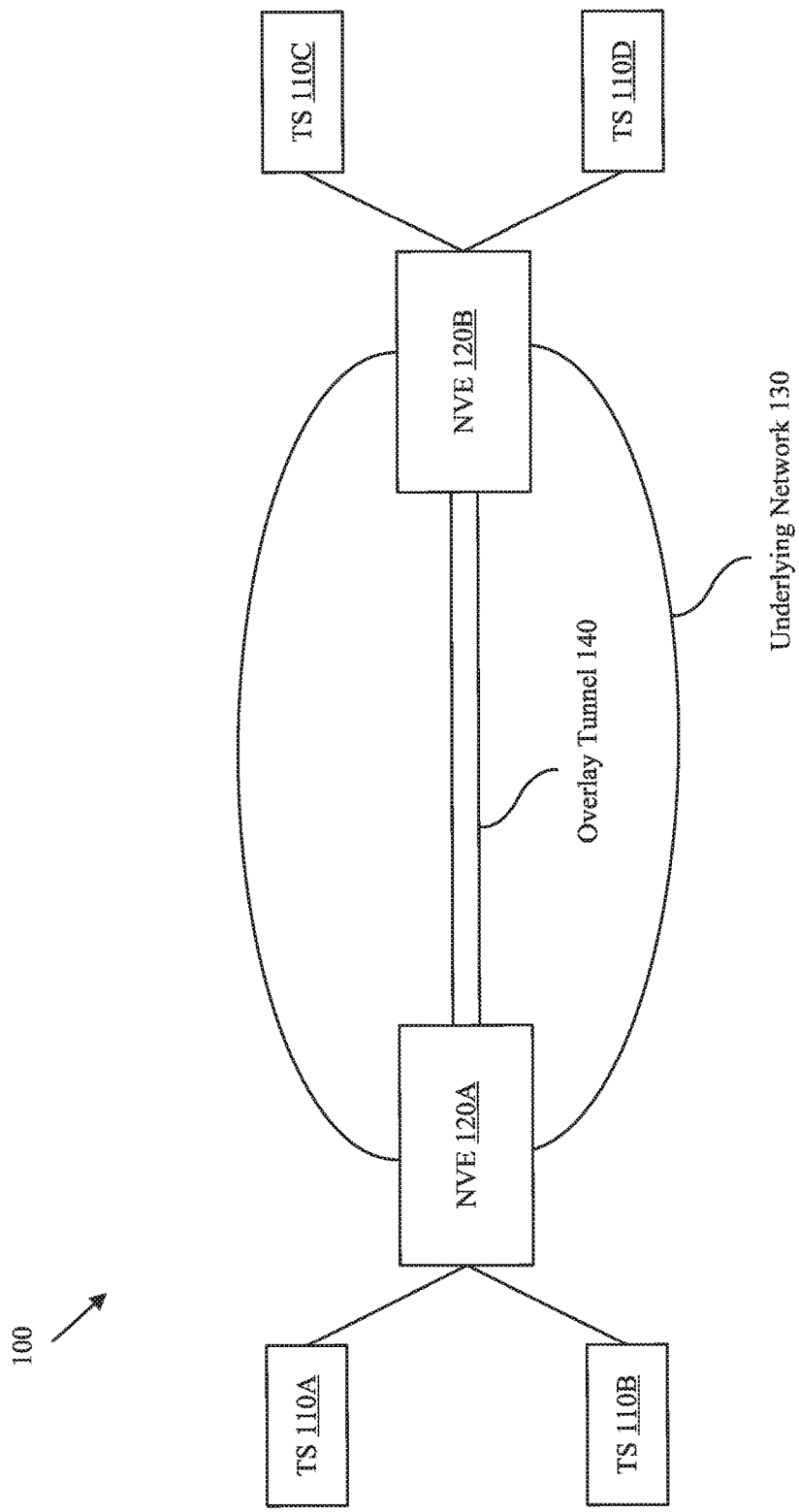
FIG. 1 is a schematic diagram of an example embodiment of an overlay network system where embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Virtualization technology supports many types of overlay traffic within one infrastructure network such as network virtualization overlays (NVO3) and service function chains (SFCs). Tunneling technology is used widely for tunneling network protocol packets over IP networks and the Internet.

Routers may redirect some overlay traffic or tunneled traffic while continually forwarding other encapsulated traffic or traffic at the router. For example, in an NVO3, a NVE may transport multi-tenant traffic that is carried over network as an overlay. Multi-homing NVEs may be used in NVO3, where one service device may connect to more than one external NVEs. Overlay traffic can be sent to one of the NVEs in order to reach the destination. An NVE may need to redirect some tenant traffic to another NVE that can also reach tenant host while still handling other tenant traffic.

In an SFC, SFC encapsulated flows traverse predefined service functions in IP networks. Some SFC flows, for example, large SFC flows, may be offloaded while other SFC flows are not. Some SFC flows may be redirected to another next service function (SF) while other SFC flows are not. When tunneling IP version 6 (IPv6) over IP version 4 (IPv4) networks, there may be more than one IPv4 edge router to hand off IPv6 traffic. A handoff IPv4 router may redirect some tunneled traffic to other handoff routers.

A tunnel egress router may need to inform a tunnel ingress about tunnel properties and tunneled traffic properties. However, tunnel end points do not support network protocols such as border gateway protocol (BGP) and interior gateway protocol (IGP) that can be used for the purpose.

It should be noted that in the present disclosure, the terms "underlying network", "infrastructure network", and "DC network" all refer to the actual physical network and may be used interchangeably. The terms "overlay virtual network" (OVN), "tenant network", "overlay instance", "overlay network", and "network virtual overlay instance" refer to network virtualization overlay as described in the Internet Engineering Task Force (IETF) document draft-narten-nvo3-arch-00, published Jul. 8, 2013, which is incorporated herein by reference, and the terms may be used interchangeably. However, a "tenant network" may also comprise one or more OVNs. The terms "tenant system" (TS) and "endpoint" refer to an entity that originates or receives data from an OVN, and may be used interchangeably.

FIG. 1 is a schematic diagram of an example embodiment of an overlay network system 100 where embodiments of the present disclosure may operate. Overlay network system 100 may comprise an underlying network 130, a plurality of NVEs 120A-B, an overlay tunnel 140, and a plurality of TSs 110A-D. In an overlay virtual network instance, any pair of NVEs 120A-B may be connected directly by an overlay tunnel 140, which may be a point-to-point (P2P), or point-to-multipoint (P2MP), or multipoint-to-point (MP2P) connection. The overlay tunnel 140 may transport encapsulated data traffic across the underlying network 130 between the pair of NVEs 120A-B. As shown in FIG. 1, NVE 120A may be an ingress tunnel endpoint for overlay tunnel 140, and NVE 120B may be an egress tunnel endpoint for overlay tunnel 140.

FIG. 1 illustrates the NVEs 120A-B residing at the boundary between a TS 110 and the OVN formed by the pair of NVEs 120A-B. Each NVE 120 may be associated with a plurality of TSs 110, and may provide network virtualization services to the associated TSs 110. A network virtualization instance may be functioned as L2 or L3 as described in the IETF document draft-narten-nvo3-arch-00, published Jul. 8, 2013, where tenant traffic may be tunneled to remote NVEs 120 based on the Media Access Control (MAC) address of the TSs 110 or the IP addresses of the TSs 110, respectively. The data packets may be forwarded between NVEs 120A-B based on the outer addresses on the packets, which may be described in more detail herein below with respect to FIGS. 5-14.

NVEs 120A-B may be implemented using software components, hardware, or a combination of both, and may be located on a virtual switch within a hypervisor, a physical switch, or server. NVEs 120A-B may perform routing, bridging, forwarding functions, and/or overlay virtual network functions. Overlay virtual network functions may include creation and maintenance of OVN states, data plane encapsulations/decapsulations, overlay tunnel initiations/establishments/tear downs, and automatic selection of overlay tunnels.

TSs 110 may include, but are not limited to VMs on a server, hosts, physical servers or other types of end devices that may originate data to or receive data from the overlay network via an NVE 120A-B. TSs 110 may comprise an L2 Ethernet interface used to communicate with their associated NVEs 120A-B. TSs 110 may be unaware of the overlay network. TSs 110 may communicate to remote TSs 110 in the same tenant network by sending packets directly to their associated NVEs 120A-B.

The underlying network 130 is a physical network that provides connectivity between NVEs 120A-B, but may be completely unaware of the overlay packets, the overlay tunnels 140, and the OVN. For instance, the underlying network 130 may be a DC physical network comprising Top of Rack (ToR) switches, aggregation switches, core switches, and/or DC gateway routers. Alternatively, the underlying network 130 may be multiple interconnected DC networks where NVEs 120A-B may be located in the same or different DC networks. In addition, the underlying network 130 may support multiple independent OVNs.

Typically, a large data center may deploy servers with different capacities, and/or features, and servers may be rolled out at different times. For example, a data center may comprise a combination of virtual servers and physical servers, which may be equipped with virtual switches. The servers that are equipped with hypervisor based virtual switches may support different encapsulation protocols, such as VXLAN encapsulation, Microsoft's NVGRE, IP GRE, MPLS or other encapsulation protocols.

The overlay tunnels 140 may transport encapsulated data packets, or encapsulated packets, with a packet header comprising an inner address field, an encapsulation header, and an outer address field. In one embodiment, the inner address field may comprise a media access control (MAC) address of a TS 110C-D that the data packet is destined to and a MAC address of the source TS 110A-D that originated the data packet. The encapsulation header may comprise a VNID, and/or other encapsulation type specific information.

Figure 2:
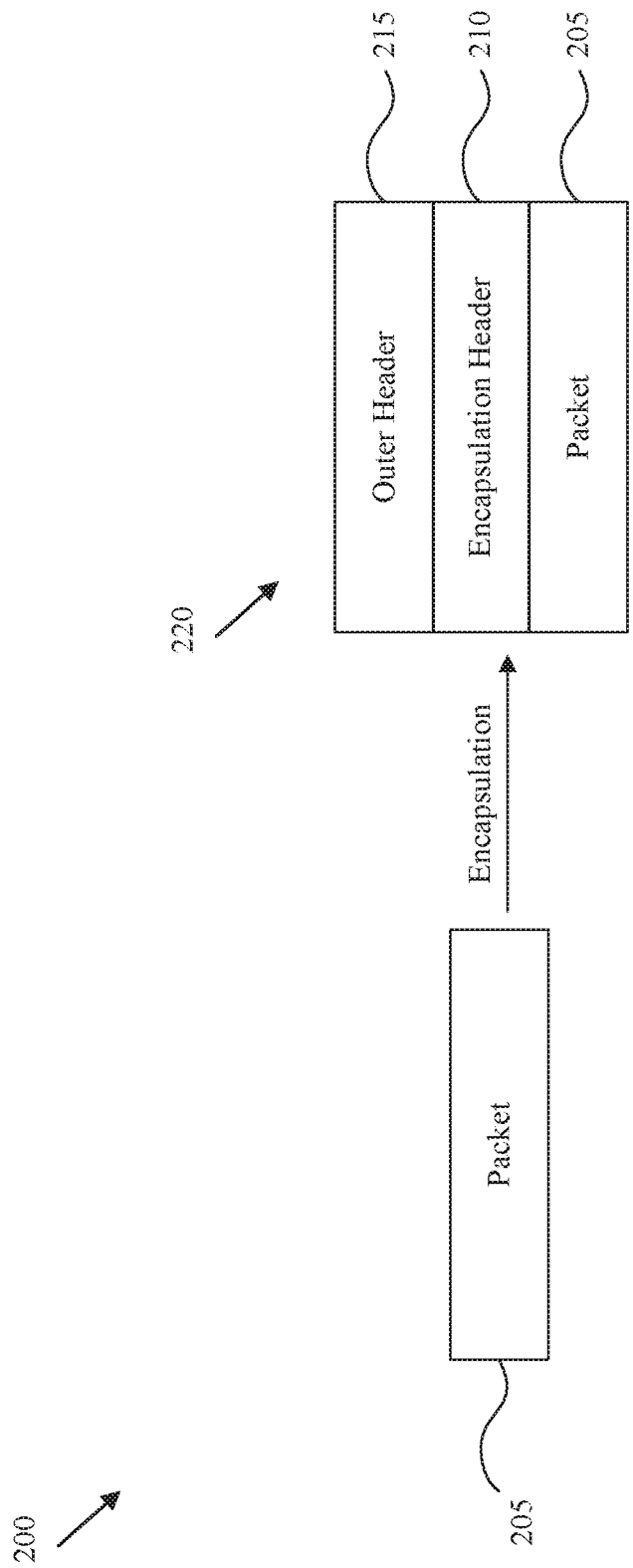
FIG. 2 is a schematic diagram illustrating the process of encapsulation performed at an NVE of the overlay network.

FIG. 2 is a schematic diagram illustrating the process of encapsulation 200 performed at an NVE of the overlay network. The encapsulation 200 may be performed after receiving a packet from an originating TS or another NVE and before transmitting a tunnel packet across an overlay tunnel. In an embodiment, the TS may be similar to TSs 110A-D, the NVE may be similar to NVEs 120A-B, and the overlay tunnel may be similar to overlay tunnel 140. Overlay tunnels may be configured such that only encapsulated packets may be transmitted across the overlay. As such, NVEs are configured to perform encapsulation 200 upon receiving the packet to transport across the tunnel.

An NVE may be configured to receive a packet 205 from an originating TS, router, or other NVE. When the NVE receives the packet 205, the NVE operates as an ingress NVE. For example, packet 205 may be an IP packet or a traffic frame, such as an Ethernet traffic frame. The packet 205 may include a data packet, which may be an IPv4 or IPv6 packet. For example, the packet 205 may include an IP header and an IP payload. For example, the IP header may include a destination address, such as a destination-MAC (D-MAC) address, and a source address, such as a source-MAC (S-MAC) address. The ingress NVE may use the destination address from the packet 205 to retrieve an address mapping table entry from an address mapping table. The address mapping table entry may include a mapping of the destination address to its associated NVE address (e.g., egress NVE address). The ingress NVE may then use the address mapping table entry to retrieve a routing table entry from a routing table. The routing table entry includes a route to the egress NVE and an encapsulation type supported by the egress NVE.

In an embodiment, the ingress NVE may check if the egress NVE supports the same encapsulation type as the ingress NVE. If so, the ingress NVE may be configured to encapsulate the packet 205 to form an encapsulated packet 220 including adding an encapsulation header 210 and an outer header 215 to the packet 205. The encapsulation header 210 may be a header for one of encapsulation protocols supported by both the ingress NVE and the egress NVE to encapsulate the packet 205. The encapsulation protocols may be a virtual extensible local area network (VXLAN), multiprotocol label switching (MPLS), user datagram protocol (UDP), generic UDP encapsulation (GUE), and service function chaining encapsulation (SFC), or other encapsulation protocols supported by the egress NVE. The outer header 215 may include a source IP address and a destination IP address. For example, the source IP address may be set to NVE 120A's IP address (e.g., NVE ingress IP address) and the destination IP address may be set to NVE 120B's IP address (e.g., NVE egress IP address). The encapsulated packet 220 may also include an inner header including the D-MAC address and the S-MAC address.

FIG. 3 is a schematic diagram of a portion of an Internet control message protocol (ICMP) redirect message 300. An ICMP redirect message is a mechanism for routers, such as NVE 120A-B, to convey routing information to hosts, such as TS 110A-D. Additional information for an ICMP redirect message is described in Internet Engineering Task Force (IETF) Request For Comments (RFC) 1122 titled, "Requirements for Internet Hosts—Communication Layers," by R. Braden published in October 1989, and in IETF RFC 4861 titled, "Neighbor Discovery for IP version 6 (IPv6)," by T. Narten, et al., published in September 2007, which are both hereby incorporated by reference as if reproduced in their entirety.

The ICMP redirect message 300 comprises a type field, a code field, a header checksum field, an IP address field, and an IP header field. The type field indicates a value (e.g., integer) that is associated with an ICMP redirect message type. The code field indicates type of data traffic to redirect. For example, a code field value of zero may indicate a redirect for a network, a code field value of one may indicate a redirect for a host, a code field value of two may indicate a redirect for a type of service and network, and a code field value of three may indicate a redirect for a type of service and a host. The header checksum field indicates a checksum value for the ICMP redirect message. The IP address field indicates an IP address of the gateway where the direction should be sent. The IP address may be a 32-bit IPv4 address or a 128-bit IPv6 address. The IP header field may comprise an IP header and additional data that is included to allow the host to match the reply with the request that caused the redirection reply.

The ICMP redirect message 300 informs a host to update its routing information and to send packets on an alternative route. According to IETF RFC 1122, if a host tries to send data through a router (R1) and R1 sends the data on another router (R2) and a direct path from the host to R2 is available, then R1 will send an ICMP redirect message to inform the host that the best route for the destination is via R2. The host should then send packets for the destination directly to R2. The router will still send the original datagram to the intended destination. However, if the datagram contains routing information, this message will not be sent even if a better route is available.

The current ICMP (v4/v6) protocol does not have visibility on overlay protocol/tunneled payload, and thus cannot be used for overlay or tunnel related applications. Overlay traffic is encapsulated by the current ICMP protocol, as shown in FIG. 2. The encapsulated tunnel packets use an IP header and 8 bytes datagrams, which is not sufficient for allowing the router to describe redirected traffic. An underlay router may carry multiple overlay traffic flows that may be IP or Ethernet frames. The application may need to redirect some overlay traffic while continuing to transmit other traffic without redirection. Current ICMP redirect messages cannot meet this requirement because they redirect all overlay traffic. Further, current ICMP protocol cannot be used by a tunnel to facilitate the tunnel transport over IP networks. A tunnel ingress and tunnel egress need to inform each other of tunnel properties and/or tunneled traffic properties, such as, encapsulation type and tunneled traffic polices, but they may not support control plane protocols such as BGP and IGP.

Disclosed herein are various embodiments for enhancing the ICMP protocol to allow routers (e.g., NVEs 120A-B) and hosts (e.g., TS 110A-D) to redirect some overlay traffic that is terminated at a first router or host to terminate on a second router or hosts while continuing to allow other overlay traffic to be terminated at the first router or host. The enhanced ICMP protocol may apply to IPv4 or IPv6 underlay network, to IPv4, IPv6, or layer 2 (L2) Ethernet overlay, and to overlay traffic that is encapsulated by different encapsulation protocols such as VXLAN, MPLS, UDP, GUE, SFC encapsulation protocol, or other encapsulation protocols. In an embodiment, the enhanced ICMP protocol allows NVE egresses to redirect overlay traffic to new NVE egresses and to inform NVE ingresses about tunnel properties and tunneled traffic properties, which enables ICMP to support overlay, virtualization, and cloud applications. The enhanced ICMP protocol may support parameters including, but not limited to, encapsulation types, checksum, security mechanisms, tunneled traffic type, the traffic policies for tunneled traffic, and tunneled traffic maximum transmission unit (MTU).

The enhanced ICMP protocol also supports IP control protocol, which may be used to facilitate overlay traffic transport over a tunnel and aligns well with software-defined network (SDN) architectures. The enhanced ICMP protocol does not require a new protocol and can be implemented using existing hardware. The enhanced ICMP protocol works well for SDN architecture or network automation. The enhanced ICMP protocol enables users to establish their own overlay network or tunnels over the Internet, which provides benefits for cloud applications.

Figure 4:
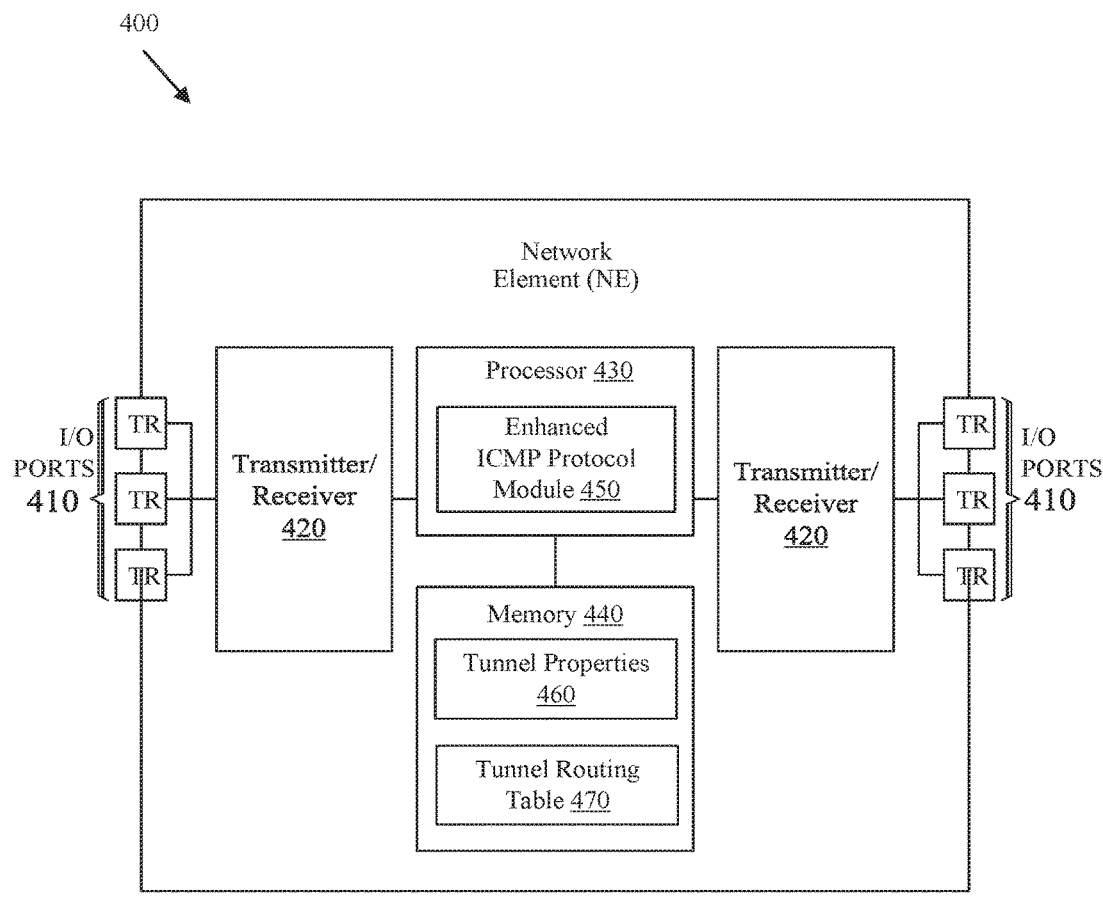
FIG. 4 is a schematic diagram of a NE for implementing an enhanced ICMP protocol.

FIG. 4 is a schematic diagram of a network element (NE) 400 for implementing an enhanced ICMP protocol. NE 400 may be suitable for implementing and/or controlling the disclosed embodiments, such as NVEs 120A-B and/or TS 110A-D. NE 400 comprises ports 410, transceiver units (Tx/Rx) 420, a processor 430, and a memory 440 comprising an enhanced ICMP protocol module 450. Ports 410 are coupled to Tx/Rx 420, which may be transmitters, receivers, or combinations thereof. The Tx/Rx 420 may transmit and receive data via the ports 410. Processor 430 is configured to process data. Memory 440 is configured to store data and instructions for implementing embodiments described herein. The NE 400 may also comprise electrical-to-optical (EO) components and optical-to-electrical (OE) components coupled to the ports 410 and Tx/Rx 420 for receiving and transmitting electrical signals and optical signals.

The processor 430 may be implemented by hardware and software. The processor 430 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 430 is in communication with the ports 410, Tx/Rx 420, and memory 440.

The processor 430 may be configured to implement the enhanced ICMP protocol module 450 to execute the instructions for implementing various embodiments disclosed herein. In an embodiment, the enhanced ICMP protocol module 450 is implemented as instructions stored in the memory 440. The processor 430 may also implement message sequence diagrams 600, 800, and 1400, and method 1500 discussed herein. The inclusion of the enhanced ICMP protocol module 450 provides an improvement to the functionality of NE 400. The enhanced ICMP protocol module 450 also effects a transformation of NE 400 to a different state.

The memory 440 comprises one or more of disks, tape drives, or solid-state drives and may be used as an over-flow data storage device, to store programs when such programs are selected for execution, and to store instructions and data that are read during program execution. The memory 440 may be volatile and non-volatile and may be read-only memory (ROM), random-access memory (RAM), ternary content-addressable memory (TCAM), and static random-access memory (SRAM). The memory device 440 may be configured to store tunnel properties 460 and a tunnel routing table 470, as discussed more fully below.

It is understood that by programming and/or loading executable instructions onto the NE 400, at least one of the processor 430 and/or memory device 440 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 5:
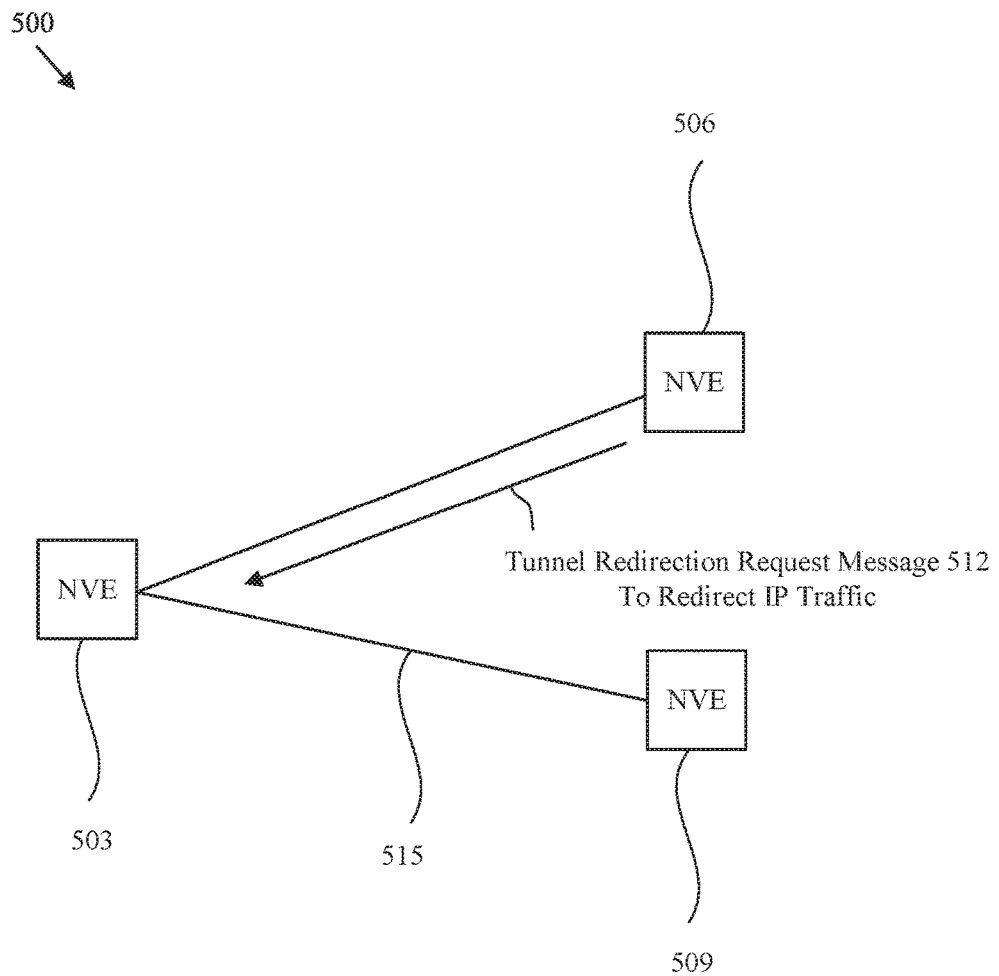
FIG. 5 is a schematic diagram illustrating an example of how a NVE processes an enhanced ICMP tunnel redirection request message to redirect IP traffic.

FIG. 5 is a schematic diagram 500 illustrating an example of how a NVE 503 processes an enhanced ICMP tunnel redirection request message 512 to redirect IP traffic. Diagram 500 includes NVEs 503, 506, and 509. In an embodiment, NVEs 503, 506, and 509 are similar to NVEs 120A-B and NE 400. NVEs 503 and 506 may communicate packets via a path in an underlying network. NVEs 503 and 509 may communicate packets via a path in an underlying network and/or encapsulated packets via an overlay tunnel 515 in an OVN. In an embodiment, the underlying network is similar to underlying network 130, and the overlay tunnel 515 is similar to overlay tunnel 140. In an embodiment, the packets are similar to packets 205, and the encapsulated packets are similar to encapsulated packets 220. In diagram 500, NVE 506 may receive packets from NVE 503. Therefore, NVE 503 is the ingress NVE, and NVE 506 is the egress NVE. The packets may include an address of a destination for the packet. For example, the address of the destination for the packet may be an IP address or MAC address.

In an embodiment, NVE 506 determines that the packets are being routed sub-optimally using NVE 506 to the destination indicated in the packet. In such a case, NVE 506 may send a tunnel redirection request message 512 to NVE 503. The TS may be similar to TS 110A-D. The tunnel redirection request message 512 informs NVE 503 that a subset of the subsequent packets to that same destination address should be encapsulated and re-routed through NVE 509 using overlay tunnel 515. In an embodiment, tunnel redirection request message 512 includes, among other parameters, an address of NVE 509 and the destination address for the packet. For example, the address of the NVE 509 may be an IP address.

In an embodiment, NVE 503 performs encapsulation on a subset of the subsequent packets originally directed to NVE 506 before re-routing the encapsulated packets through NVE 509 using overlay tunnel 515. For example, the encapsulation of the subset of the subsequent packets may be performed according to the process of encapsulation 200. In an embodiment, NVE 503 determines the encapsulation protocols that are supported by NVE 509. For example, the encapsulation protocols that are supported by NVE 509 may be stored in an entry in tunnel properties 460 stored in memory 440 of NE 400. NVE 503 then performs encapsulation on the subset of the subsequent packets that have the same destination address as the destination address included in the tunnel redirection request message 512 according to one of the encapsulation protocols that are supported by NVE 509. In an embodiment, NVE 503 performs encapsulation on the subset of the subsequent packets by adding an encapsulation header and an outer header to the packets. In an embodiment, the encapsulation header may be similar to encapsulation header 210, and the outer header may be similar to outer header 215. In an embodiment, NVE 503 is also configured to add the address of NVE 509 into the outer header of the encapsulated packet.

In an embodiment, NVE 503 may include a tunnel routing table stored at a memory of the NVE 503. For example, the tunnel routing table may be similar to tunnel routing table 470 stored in memory 440 of NE 400. The tunnel routing table may include a routing entry for the destination included in the tunnel redirection request message 512. The routing entry may include NVE 506 as part of the route for packets intended for the destination to be forwarded through. In an embodiment, the NVE 503 ignores the routing entry for the packets intended for the destination and replaces the outer header to indicate the redirection of the route from NVE 506 to NVE 509. In an embodiment, NVE 503 updates the tunnel routing table to reflect that packets having the destination address indicated by the tunnel redirection request message 512 should be transmitted to NVE 509 instead of NVE 506.

In an embodiment, NVE 503 establishes the overlay tunnel 515 between NVE 503 and NVE 509 for overlay traffic intended for the destination specified by the tunnel redirection request message 512. NVE 503 redirects encapsulated packets to NVE 509 instead of NVE 506 using the overlay tunnel 515. Since only the subset of the subsequent packets that have the same destination address as the destination address included in the tunnel redirection request message 512 were encapsulated, NVE 503 may be configured to transmit the remaining packets that do not have the same destination address as the destination address included in the tunnel redirection request message 512 to NVE 509 using a path in the underlying network. In this way, NVE 503 is configured to redirect some traffic to NVE 509 via the overlay tunnel 515 while sending remaining traffic to NVE 506 without using the tunnel.

Figure 6:
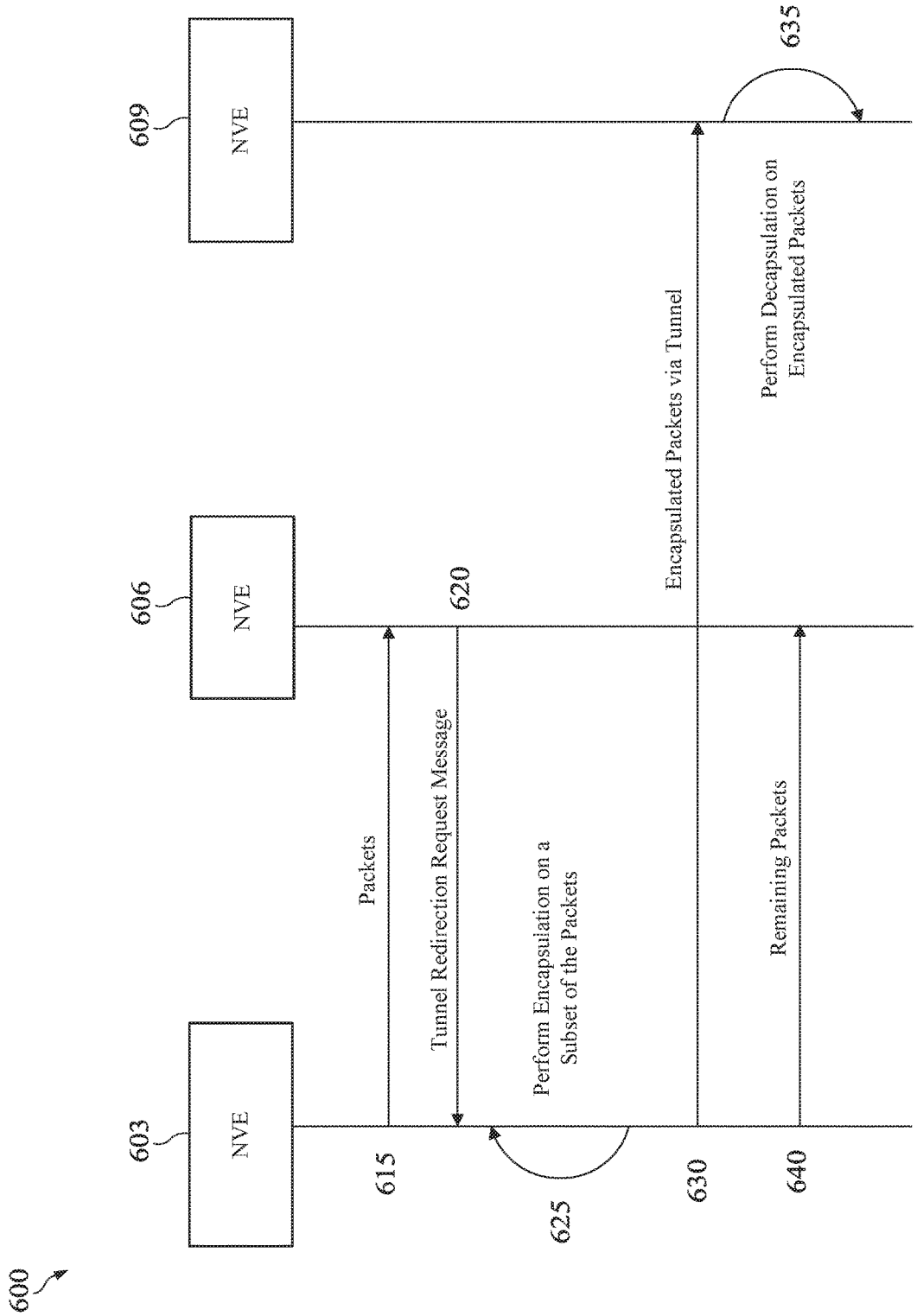
FIG. 6 is a message sequence diagram illustrating an example of how a NVE processes an enhanced ICMP tunnel redirection request message to redirect IP traffic.

FIG. 6 is a message sequence diagram 600 illustrating an example of how a NVE 603 processes an enhanced ICMP tunnel redirection request message to redirect IP traffic. NVE 603 processes the enhanced ICMP tunnel redirection request message similar to how NVE 503 processes the redirection request message. The steps shown in diagram 600 are implemented when NVE 603 receives packets, such as packets 205, from a TS, such as TS 110A-D, over an underlying network. Diagram 600 includes NVEs 603, 606, and 609. In an embodiment, NVEs 603, 606, and 609 are similar to NVEs 120A-B and NE 400. For example, enhanced ICMP protocols module 450 executed by each of NVEs 603, 606, and 609 may implement some or all of the steps in diagram 600. NVEs 603 and 606 may communicate packets via a path in an underlying network. NVEs 606 and 609 may communicate packets via a path in an underlying network and/or encapsulated packets via an overlay tunnel in an OVN. In an embodiment, the underlying network is similar to underlying network 130, and the overlay tunnel is similar to overlay tunnel 140. In an embodiment, the packets are similar to packets 205, and the encapsulated packets are similar to encapsulated packets 220.

At step 615, NVE 603 transmits packets to NVE 606. The packets may include an address of a destination for the packet. For example, the address of the destination for the packet may be an IP address or MAC address. In an embodiment, the packets are routed to NVE 606 according to a routing table stored at the NVE 603. The TS may be similar to TS 110A-D. In an embodiment, the TS initiates transmission of the packets to the destination specified in the packets via NVE 603 and then NVE 606.

At step 620, NVE 606 sends a tunnel redirection request message to NVE 603. In an embodiment, NVE 606 sends the tunnel redirection request message to NVE 603. In an embodiment, NVE 606 sends the tunnel redirection request message to a control entity that can inform NVE 603 to redirect traffic according to the tunnel redirection request message. For example, an SDN controller may be implemented to control the routing of packets across the underlying network and encapsulated packets across the overlay network. The SDN controller may control the redirection of underlying network traffic to an overlay tunnel in the overlay network according to the tunnel redirection request message. In an embodiment, NVE 606 sends the tunnel redirection request message to NVE 603 when NVE 606 determines that the packets are being routed sub-optimally using NVE 606. The tunnel redirection request message informs NVE 603 that subsequent packets to that same destination address should be encapsulated and re-routed through NVE 609 using an overlay tunnel. The tunnel redirection request message may include, but is not limited to, a redirect target IP address, origin outer IP addresses, virtual network instance (VNI) identifier, an inner address family, and inner addresses information.

At step 625, NVE 603 performs encapsulation on a subset of the subsequent packets before re-routing the encapsulated packets through NVE 609 using the overlay tunnel. For example, the encapsulation of the subsequent packets may be performed according to the process of encapsulation 200. In an embodiment, NVE 603 performs encapsulation on the subset of the subsequent packets having the same destination address as the destination address included in the tunnel redirection request message. In an embodiment, NVE 603 performs encapsulation on the subsequent packets by adding an encapsulation header and an outer header to the packets. In an embodiment, the encapsulation header may be similar to encapsulation header 210, and the outer header may be similar to outer header 215. In an embodiment, NVE 603 is also configured to add the address of NVE 606 into the outer header of the encapsulated packet.

At step 630, NVE 603 tunnels the encapsulated packets to NVE 609 instead of NVE 606. In this way, the NVE 603 tunnels the overlay traffic identified by the IP address in the tunnel redirection request message to NVE 609. Redirected traffic may comprise virtual network traffic, traffic flows identified by the inner address on the message, or both. An underlay network can be IPv4 or IPv6 and an overlay/tunneled payload type may be the same as or different from tunnel delivery network. At step 635, NVE 609 continuously decapsulates and forwards the traffic.

At step 640, NVE 603 sends the remaining packets that were not encapsulated to the NVE 606 via the underlying network. In an embodiment, NVE 603 is configured to forward the subsequent packets having a different destination address as the destination address included in the tunnel redirection request message. In this way, NVE 603 is configured to redirect some traffic to NVE 609 via a tunnel while sending remaining traffic to NVE 606 without using the tunnel.

In an embodiment, NVE 603 may be configured to only encapsulate and redirect certain packets to NVE 609. For example, the tunnel redirection request message may indicate that only packets destination for a specified destination address is to be redirected to NVE 609. In this way, NVE 603 may continue to forward packets destined for any other destination address to NVE 606.

Figure 7:
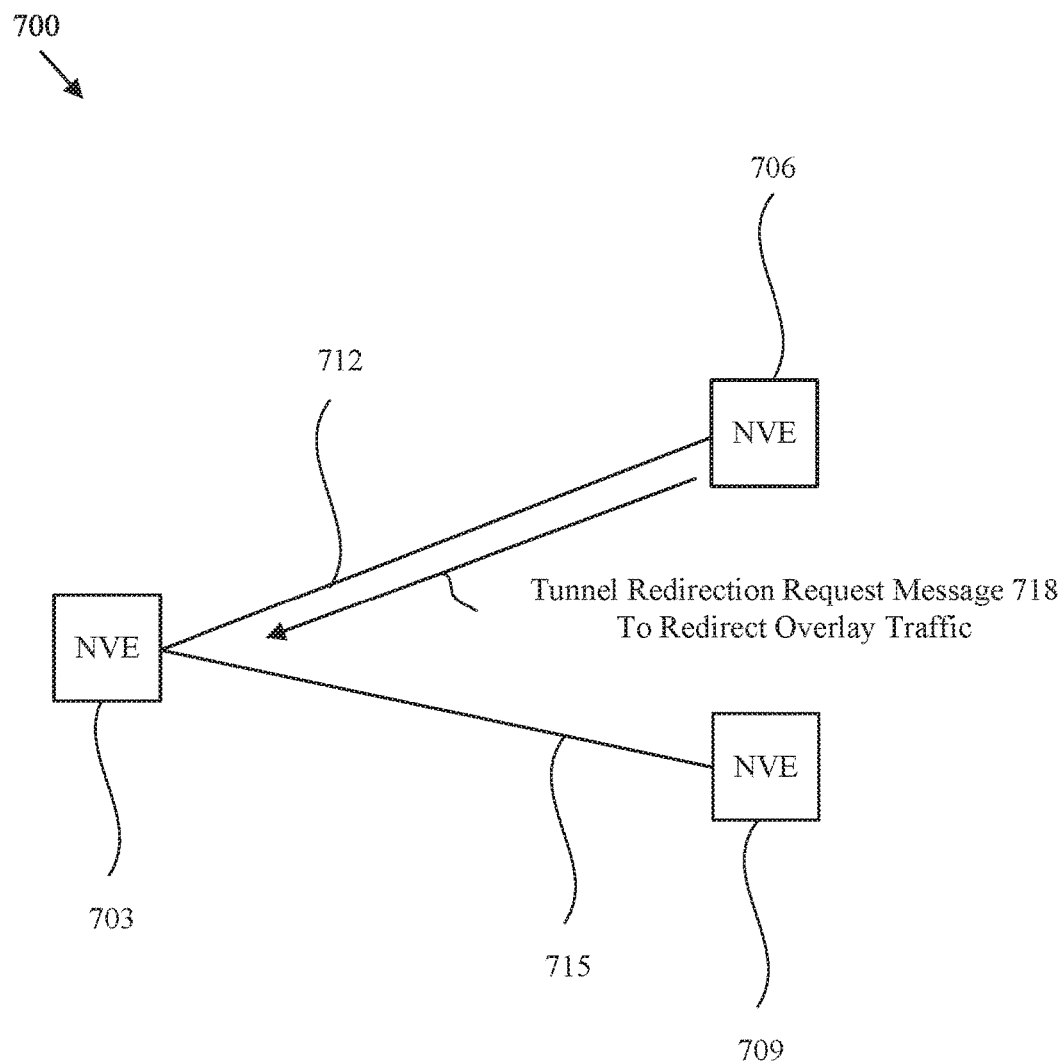
FIG. 7 is a schematic diagram illustrating an example of how a NVE processes an enhanced ICMP tunnel redirection request message to redirect overlay traffic.

FIG. 7 is a schematic diagram 700 illustrating an example of how a NVE 703 processes an enhanced ICMP tunnel redirection request message 718 to redirect overlay traffic. Diagram 700 is similar to diagram 500, except that diagram 700 relates to a case in which NVE 703 redirects overlay traffic instead of IP traffic. Diagram 700 includes NVEs 703, 706, and 709. In an embodiment, NVEs 703, 706, and 709 are similar to NVEs 120A-B and NE 400. NVEs 703 and 706 may communicate encapsulated packets via an overlay tunnel 712 in an OVN. NVEs 703 and 709 may also communicate encapsulated packets via an overlay tunnel 715 in an OVN. In an embodiment, the underlying network is similar to underlying network 130, and the overlay tunnel is similar to overlay tunnel 140. In an embodiment, the encapsulated packets are similar to encapsulated packets 220. In diagram 700, NVE 706 may receive encapsulated packets from NVE 703. The encapsulated packets may include a payload, an address of a destination for the payload, an encapsulation header, and an outer header. The outer header may include an IP address of NVE 706.

In an embodiment, NVE 706 determines that the encapsulated packets are being routed sub-optimally using NVE 706. In such a case, NVE 706 sends a tunnel redirection request message 718 to NVE 703. The tunnel redirection request message 718 informs NVE 703 that subsequent encapsulated packets to that same destination address should be encapsulated and re-routed through NVE 709 using overlay tunnel 715. In an embodiment, tunnel redirection request message 718 includes an address of NVE 709, a VNID, and an IP prefix.

In an embodiment, NVE 703 receives subsequent encapsulated packets with an outer header indicating that the encapsulated packet should be transmitted to NVE 706. NVE 703 parses the encapsulated packets and determines which packets have the same VNID and IP prefix as the VNID and IP prefix included in the tunnel redirection request message 718. In an embodiment, NVE 703 determines which packets are directed to the same destination address as the destination address in the tunnel redirection request. NVE 703 re-routes the encapsulated packets with the same VNID, IP prefix, and/or destination address as the VNID, IP prefix, and/or destination address included in the tunnel redirection request message 718 to NVE 709 instead of NVE 706. In an embodiment, a tunnel routing table (e.g., tunnel routing table 470) at NVEs 703, 706, and 709 may not need to be updated to reflect this re-routing. In an embodiment, the tunnel routing table is updated to reflect the re-routing of the encapsulated packets with the same VNID, IP prefix, and/or destination address as the VNID, IP prefix, and/or destination address included in the tunnel redirection request message 718 to NVE 709 instead of NVE 706.

NVE 703 may be configured to continue transmitting the encapsulated packets that do not have the same VNID, IP prefix, and/or destination address as the VNID, IP prefix, and/or destination address included in the tunnel redirection request message 718 to NVE 706. In this way, the tunnel redirection request message 718 tells the NVE 703 to only redirect certain encapsulated packets to another NVE while allowing other encapsulated packets to continue transmitting to the original NVE. NVE 703 is configured to redirect some overlay traffic to NVE 709 via the overlay tunnel 715 while continuing to transmit other overlay traffic to NVE 706 via overlay tunnel 712.

Figure 8:
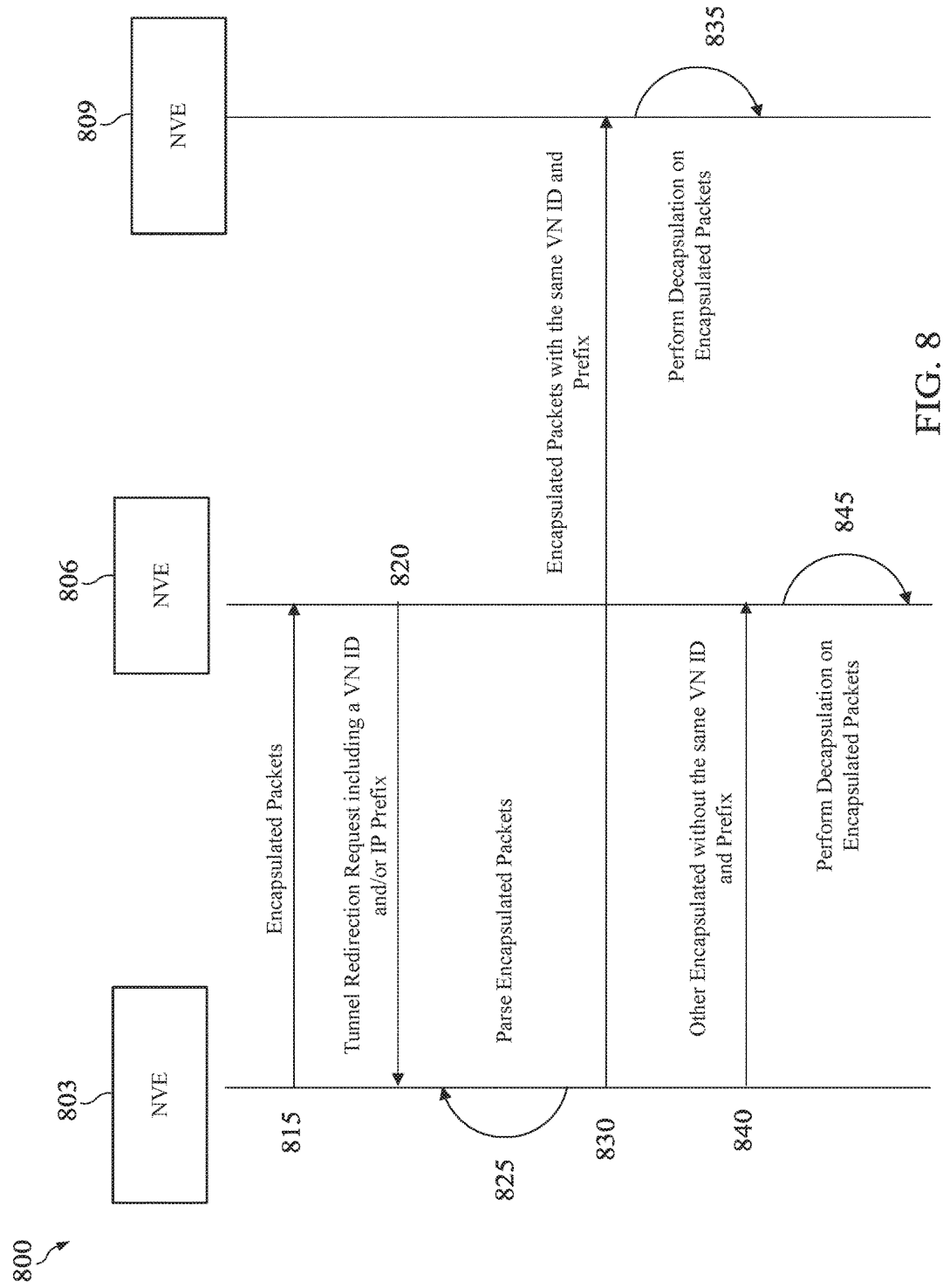
FIG. 8 is a message sequence diagram illustrating an example of how a NVE processes an enhanced ICMP tunnel redirection request message to redirect overlay traffic.

FIG. 8 is a message sequence diagram 800 illustrating an example of how a NVE 803 processes an enhanced ICMP tunnel redirection request message to redirect overlay traffic. The steps shown in diagram 800 are implemented when NVE 803 receives encapsulated packets, such as encapsulated packets 220, from a TS, such as TS 110A-D. Diagram 800 includes NVEs 803, 806, and 809. In an embodiment, NVEs 803, 806, and 809 are similar to NVEs 120A-B and NE 400. For example, the enhanced ICMP protocol module 450 executed by each of NVEs 803, 806, and 809 may implement some or all of the steps in diagram 800. NVEs 803 and 806 may communicate encapsulated packets via an overlay tunnel in an OVN. NVEs 803 and 809 may also communicate encapsulated packets via an overlay tunnel in an OVN. In an embodiment, the underlying network is similar to underlying network 130, and the overlay tunnel is similar to overlay tunnel 140. In an embodiment, the encapsulated packets are similar to encapsulated packets 220. The encapsulated packets may include a payload, an address of a destination for the payload, an encapsulation header, and an outer header.

At step 815, NVE 803 transmits encapsulated packets to NVE 806. The outer header of the encapsulated packet may include an IP address of NVE 803, and an inner header of the encapsulated packet may include an address for the destination of the packet. For example, the address of the destination for the packet may be an IP address or MAC address. In an embodiment, the TS initiates transmission of the packets to the destination specified in the packets. NVE 803 encapsulates the packets and sends the packets to NVE 806.

At step 820, NVE 806 sends an enhanced ICMP tunnel redirection request message to NVE 803. In an embodiment, NVE 806 sends the tunnel redirection request message to NVE 803. In an embodiment, NVE 806 sends the tunnel redirection request message to a control entity that can inform NVE 803 to redirect traffic according to the tunnel redirection request message. For example, an SDN controller may be implemented to control the routing of packets across the underlying network and encapsulated packets across the overlay network. The SDN controller may control the redirection of underlying network traffic to an overlay tunnel in the overlay network according to the tunnel redirection request message. In an embodiment, NVE 806 sends the tunnel redirection request message to NVE 803 when NVE 806 determines that the packets are being routed sub-optimally using NVE 806. The tunnel redirection request message informs NVE 803 that subsequent encapsulated packets to that same destination address should be parsed such that only certain encapsulated packets are re-routed through NVE 809 using an overlay tunnel. The tunnel redirection request message may include, but is not limited to, a redirect target IP address, origin outer IP addresses, VNID, an IP prefix, an inner address family, and inner addresses information.

NVE 803 may receive subsequent encapsulated packets with an outer header indicating that the encapsulated packet should be transmitted to NVE 806. At step 825, NVE 803 parses the encapsulated packets and determines which packets have the same VNID, IP prefix, and/or destination address as the VNID, IP prefix, and/or destination address included in the enhanced ICMP tunnel redirection request message. At step 830, NVE 803 re-routes the encapsulated packets with the same VNID, IP prefix, and/or destination address as the VNID, IP prefix, and/or destination address included in the tunnel redirection request message to NVE 809 instead of NVE 806. In an embodiment, NVE 803 is also configured to replace the address of NVE 806 with an address of NVE 809 in the outer header of the encapsulated packets that are being re-routed. At step 835, NVE 809 continuously decapsulates the traffic and forwards the traffic upon receiving the traffic from NVE 803.

At step 840, NVE 803 continues transmitting the encapsulated packets that do not have the same VNID, IP prefix, and/or destination address as the VNID, IP prefix, and/or destination address included in the enhanced ICMP tunnel redirection request message to NVE 806. In this way, the tunnel redirection request message tells the NVE 803 to only redirect certain encapsulated packets to another NVE while allowing other encapsulated packets to continue transmitting to the original NVE. At step 845, NVE 806 continuously decapsulates the traffic and forwards the traffic upon receiving the traffic from NVE 803.

Figure 9A:
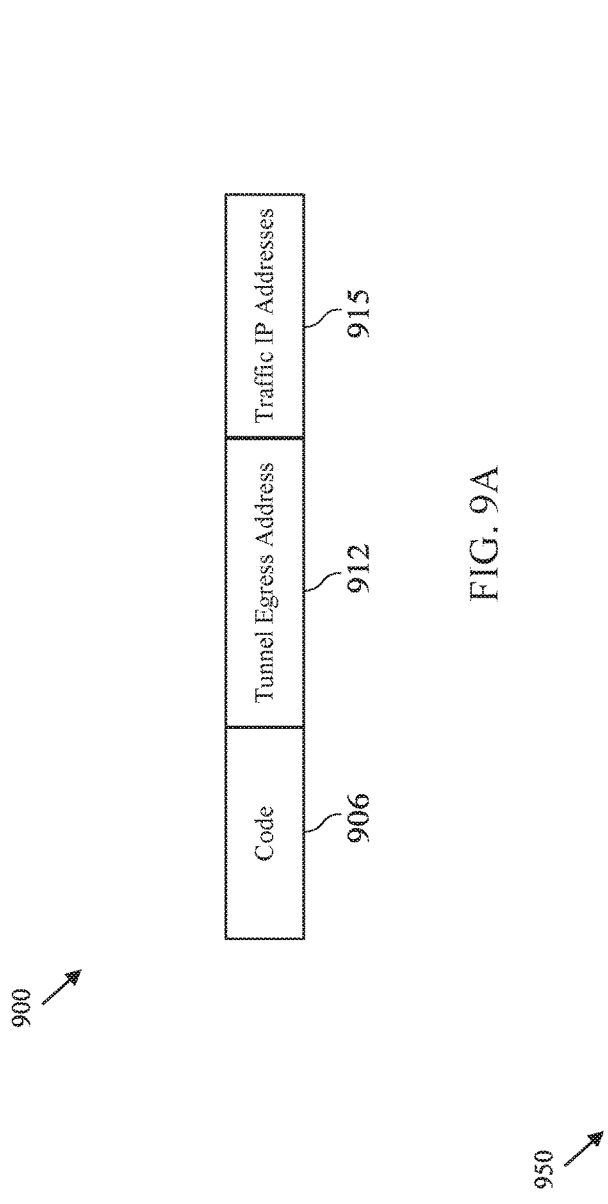
FIGS. 9A-B illustrates example embodiments of an enhanced ICMP tunnel redirection request messages.
Figure 9B:
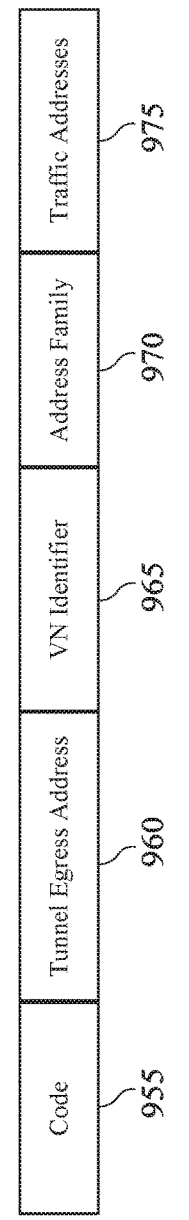

FIGS. 9A-B illustrate example embodiments of at least a portion of enhanced ICMP tunnel redirection request messages 900 and 950. In an embodiment, the enhanced ICMP protocol module 450 is configured to generate the enhanced ICMP tunnel redirection request messages 900 and 950. For example, the Tx/Rx 420 is configured to send and receive the enhanced ICMP tunnel redirection request message 900 and 950.

As shown in FIG. 9A, enhanced ICMP tunnel redirection request message 900 may include a code 906, a tunnel type 909, a tunnel egress address 912, and a traffic IP addresses 915. As should be appreciated, the enhanced ICMP tunnel redirection request message 900 may include additional fields describing the requesting NVE, the receiving NVE, and/or the NVE to which the encapsulated packets are redirected to. In an embodiment, the enhanced ICMP tunnel redirection request message 900 is sent by NVEs 509 and 606 to redirect IP packets via an overlay tunnel. The code 906 indicates whether the tunnel redirection request message 900 is a request to redirect IP traffic. For example, a first alphanumeric code in the code 906 indicates that the tunnel redirection request message 900 is a request to redirect IP traffic (e.g., tunnel redirection request message 512). For example, when the code 906 indicates that the ICMP tunnel redirection request message 900 is to redirect IP traffic, the other fields in the ICMP tunnel redirection request message 900 may include the tunnel egress address 912, and the traffic IP addresses 912. The tunnel egress address 912 may indicate whether the IP address of the NVE that encapsulated packets are being redirected to is a 32-bit IPv4 address or a 128-bit IPv6 address. In an embodiment, the tunnel egress address 912 is the IP address of the NVE that encapsulated packets are being redirected to. The traffic IP addresses 912 may be an IP, MAC, or MPLS address indicating a destination of the packets that are to be redirected and/or an IP address of the next NVE to redirect the encapsulated packets to.

As shown in FIG. 9B, enhanced ICMP tunnel redirection request message 950 may include a code 955, a tunnel egress address 960, a VNID 965, an address family 970, and a traffic addresses 975. As should be appreciated, the enhanced ICMP tunnel redirection request message 950 may include additional fields describing the requesting NVE, the receiving NVE, and/or the NVE to which the encapsulated packets are redirected to. In an embodiment, the enhanced ICMP tunnel redirection request message 950 is sent by NVEs 706 and 806 to redirect overlay packets via an overlay tunnel. The code 955 indicates whether the tunnel redirection request message 950 is a request to redirect overlay traffic. For example, a second alphanumeric code in the code 955 indicates that the tunnel redirection request message 950 is a request to redirect overlay traffic (e.g., tunnel redirection request message 712). For example, when the code 955 indicates that the ICMP tunnel redirection request message 950 is to redirect overlay traffic, the other fields in the ICMP tunnel redirection request message 950 include the tunnel egress address 960, VNID 965, address family 970, and traffic addresses 975. The tunnel egress address 960 may indicate whether the IP address of the NVE that encapsulated packets are being redirected to is a 32-bit IPv4 address or a 128-bit IPv6 address. The VNID 965 is an identifier of the VN and/or an identifier of a VN instance with which one or more of the NVEs transmitting and/or receiving the tunnel redirection request message 950 is part of. The VNID 918 may also be an identifier of an address family, such as, Ethernet, transparent interconnection of lots of links (TRILL), MPLS/VPN, or other encapsulated traffic. The address family 970 may indicate an address family of the sending or receiving NVE. Traffic addresses 975 may be an IP, MAC, or MPLS address indicating a destination of the packets that are to be redirected. The VNID 965 and the traffic addresses 975 pair up to express multiple VN traffic. In an embodiment, tunnel egress address 912 and 960, traffic IP addresses 915, VNID 965, and traffic addresses 975 use a type-length-value (TLV) format to encode the information in the message.

Figure 10:
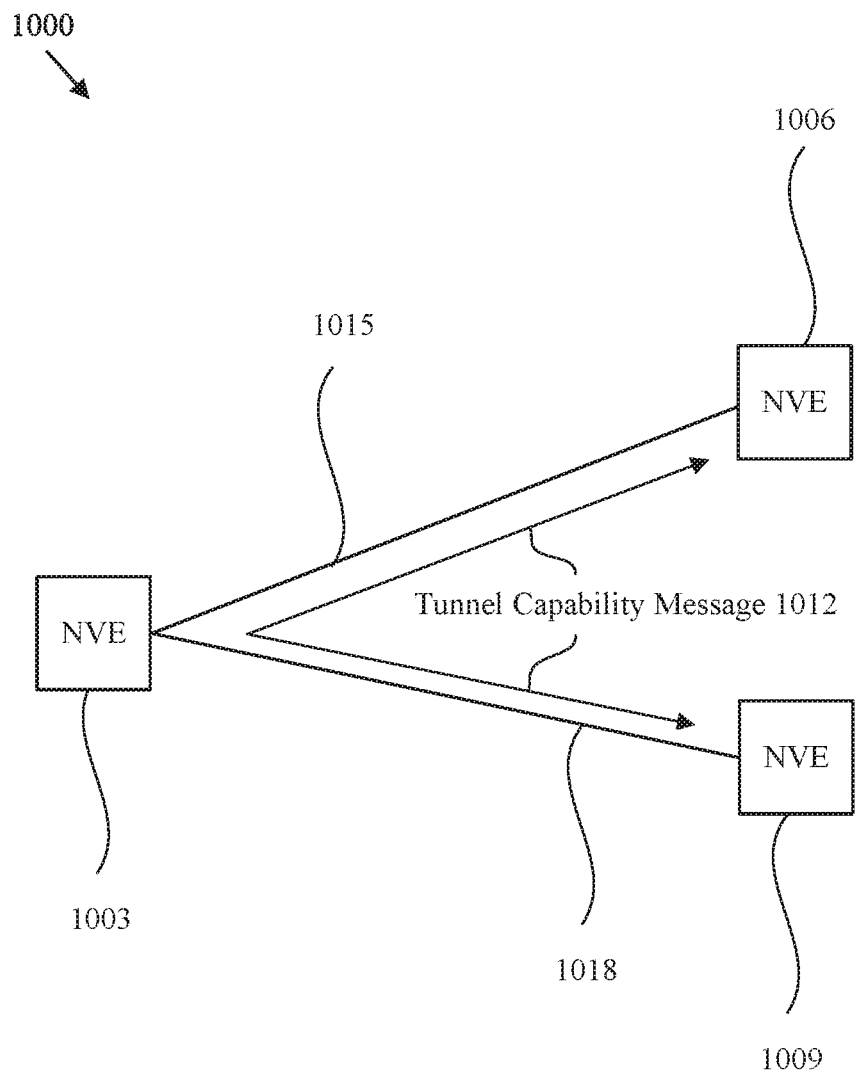
FIG. 10 is a schematic diagram illustrating an example of how a NVE sends enhanced ICMP tunnel capability messages to other NVEs.

FIG. 10 is a schematic diagram 1000 illustrating an example of how an NVE 1003 sends enhanced ICMP tunnel capability message 1012 to NVEs 1006 and 1009. Diagram 1000 includes NVEs 1003, 1006, and 1009. In an embodiment, NVEs 1003, 1006, and 1009 are similar to NVEs 120A-B and NE 400. NVE 1003 communicates with NVEs 1006 and 1009 via a path in an underlying network or an overlay tunnel in an OVN. In an embodiment, the underlying network is similar to underlying network 130, and the overlay tunnel is similar to overlay tunnel 140. NVE 1003 may be a tunnel ingress and NVE 1006 may be a tunnel egress for overlay tunnel 1015. Similarly, NVE 1003 may be a tunnel ingress and NVE 1009 may a tunnel ingress for overlay tunnel 1018.

NVE 1003, 1006, 1009 may be configured to generate a tunnel capability message 1012 that includes tunnel property and tunneled traffic property information. Tunnel properties include, but are not limited to, supported tunnel encapsulation types, tunneled payload type, checksum capability, security capability, and offload capability. Tunneled traffic properties include, but are not limited to, traffic policies such as access control list (ACL) or application type, accepted rate, and traffic MTU size. The tunnel capability message 1012 may use a TLV format to encode the information in the message.

A router or host that terminates a tunnel, such as NVE 1006 and 1109, uses the tunnel capability message 1012 to convey the tunnel properties and tunneled traffic properties. Upon receiving the tunnel capability message 1012, a tunnel ingress, such as NVE 1003, may automatically configure the tunnel to meet the tunnel egress encapsulation property. Upon receiving overlay traffic, tunnel ingress locally performs the traffic filtering based on the received traffic policies before performing encapsulation (e.g., process of encapsulation 200). In an embodiment, a tunnel ingress sends the tunnel capability message 1012 to a tunnel egress to request tunnel property information for a specific tunneled traffic after receiving a new outer address from an NVE, TS, or SDN controller. A tunnel capability message may be employed to facilitate tunnel operation or as a tunnel trace or ping response. A tunnel egress or stitching points may also send a tunnel capability message as response to a tunnel ingress that initiates tunnel trace, ping packets, or another operation entity.

Figure 11:
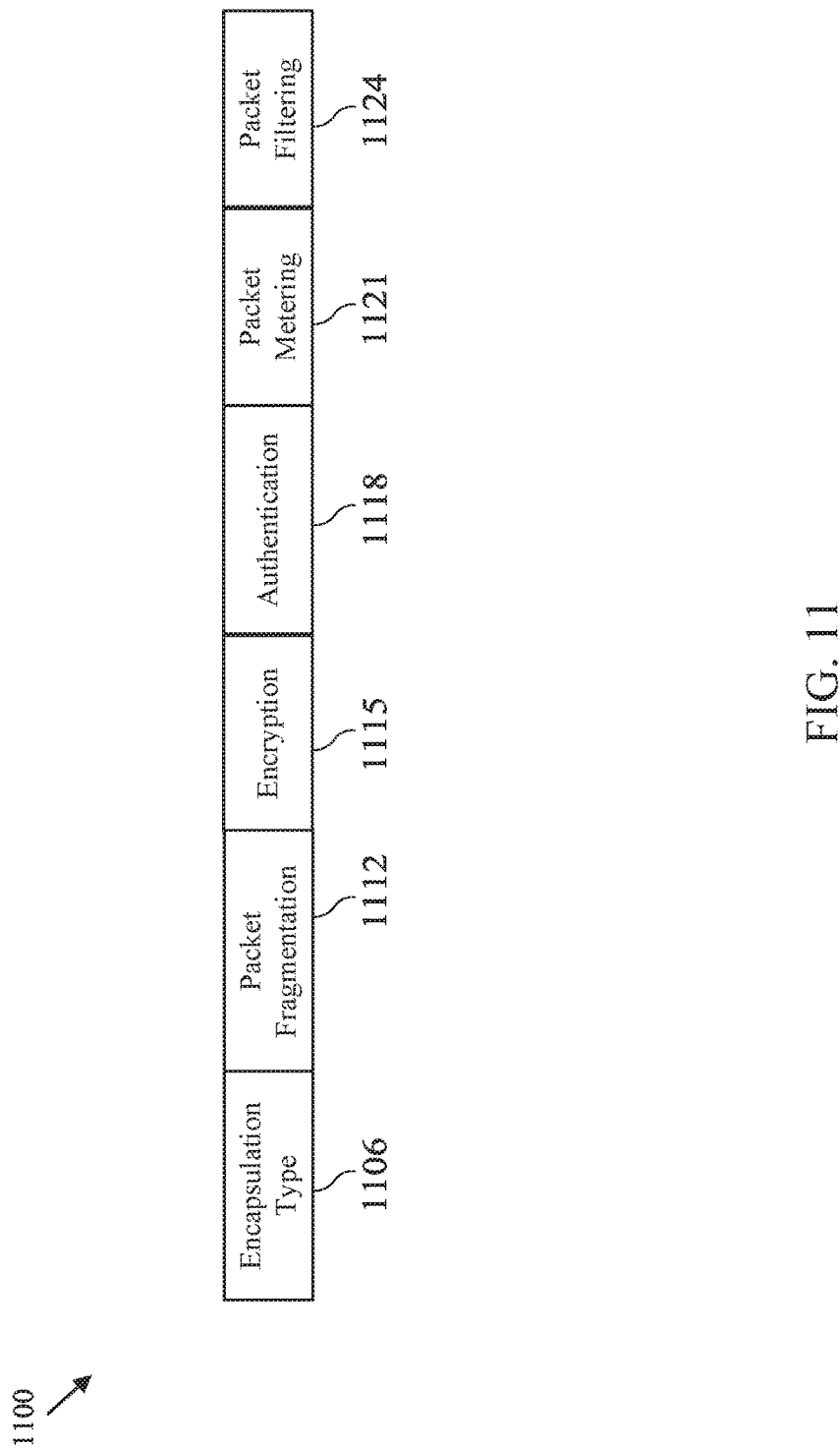
FIG. 11 illustrates an example embodiment of an enhanced ICMP tunnel capability message.

FIG. 11 illustrates an example embodiment of at least a portion of an enhanced ICMP tunnel capability message 1100. In an embodiment, the enhanced ICMP protocol module 450 is configured to generate the enhanced ICMP tunnel capability message 1100. For example, the Tx/Rx 420 is configured to send and receive the enhanced ICMP tunnel capability message 1100. The enhanced ICMP tunnel capability message 1100 may include an encapsulation type 1106, a packet fragmentation 1112, an encryption 1115, an authentication 1118, a packet metering 1121, and a packet filtering 1124. As should be appreciated, the enhanced ICMP tunnel capability message 1100 may include additional fields describing a capability or property of the ingress NVE, egress NVE, and/or tunnel established between the ingress NVE and the egress NVE. The encapsulation type 1106 identifies an encapsulation protocol used in encapsulating the packets for tunneling. For example, encapsulation type 1106 may include an identifier of the protocol encapsulation protocols used by the NVE sending the tunnel capability message 1100. The identifiers identify an encapsulation protocol such as VXLAN, MPLS, UDP, GUE, SFC encapsulation protocol, or other encapsulation protocols. The packet fragmentation 1112 indicates whether the NVE sending the tunnel capability message 1100 supports packet fragmentation and/or how packet fragmentation is implemented by the NVE. The encryption 1115 indicate whether the NVE sending the tunnel capability message 1100 supports encryption and/or how encryption is implemented by the NVE. Authentication 1118 indicates whether the NVE supports authentication and/or how authentication is performed by the NVE. Packet metering 1121 indicate whether the NVE sending the tunnel capability message 1100 supports packet metering and/or how the NVE meters incoming packets. Packet filtering 1124 indicates whether the NVE sending the tunnel capability message 1100 supports packet filtering and/or how the NVE filters incoming packets. In this way, the tunnel capability message includes features that a tunnel egress and/or tunnel ingress may support. A feature can be used in tunneling if both the tunnel ingress and the tunnel egress are able to support the feature.

In an embodiment, an egress NVE receives a tunnel operations message from an ingress NVE. The tunnel operations message may include an identifier of a certain type of packet that should be filtered by the ingress NVE so that such packets are not received by the egress NVE. In an embodiment, a processor (e.g., processor 430) of the ingress NVE is configured to prevent the types of packets indicated in the tunnel operations request from being forwarded to the egress NVE.

In an embodiment, an ingress NVE receives a first tunnel operations message from an egress NVE. The first tunnel operations message is a request for the first NVE to meter packets satisfying a condition for a period of time that are transmitted to the egress NVE. A processor of the ingress NVE is configured to meter the packets satisfying the condition before transmitting the packets to the egress NVE in response to receiving the first tunnel operations message. After the period of time, the ingress NVE transmits a second tunnel operations message to the egress NVE. The second tunnel operations message may include a number of packets that satisfy the condition that were transmitted to the egress NVE during the period of time.

Figure 12:
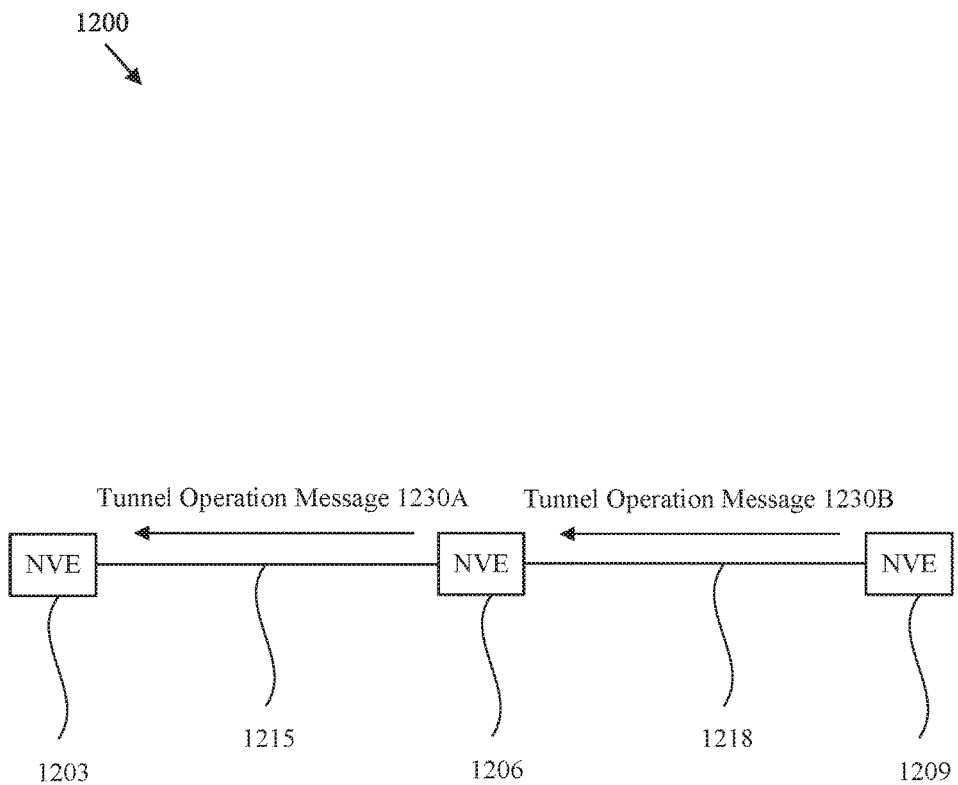
FIG. 12 is a schematic diagram illustrating an example of how enhanced ICMP tunnel operations messages are received and processed between NVEs.

FIG. 12 is a schematic diagram 1200 illustrating an example of enhanced ICMP tunnel operations messages 1230A and 1230B are received and processed between NVEs 1203, 1206, and 1209. Diagram 1200 includes NVEs 1203, 1206, and 1209. In an embodiment, NVEs 1203, 1206, and 1209 are similar to NVEs 120A-B and NE 400. NVE 1203 and NVE 1206 may communicate via an overlay tunnel 1215, and NVE 1206 and NVE 1209 may communicate via an overlay tunnel 1218. In an embodiment, the overlay tunnel is similar to overlay tunnel 140. NVE 1203 may be a tunnel ingress and NVE 1206 may be a tunnel egress for overlay tunnel 1215. For example, NVE 1209 may receive overlay traffic with encapsulated packets via overlay tunnel 1218 from NVE 1206. Similarly, NVE 1206 may receiver overlay traffic with encapsulated packets via overlay tunnel 1215 from NVE 1203.

As shown in diagram 1200, NVE 1206 sends a tunnel operations message 1230A to NVE 1203 via overlay tunnel 1218, and NVE 1209 sends a tunnel operations message 1230B to NVE 1206 via overlay tunnel 1215. In an embodiment, tunnel operations messages 1230A-B include one or more operations that one NVE is asking another NVE to perform. For example, the tunnel operations message 1230A may include a VN traffic rate limitation. In this way, NVE 1206, as the ingress tunnel, is requesting NVE 1203, as the egress tunnel, to limit VN traffic by the VN traffic rate limitation in the tunnel operations message 1230A. NVE 1203 may then perform traffic metering on the VN traffic directed towards NVE 1206 to ensure that VN traffic to NVE 1206 does not exceed the VN traffic rate limitations. Similarly, the tunnel operations message 1230B may also include a VN traffic rate limitation by which to limit VN traffic towards NVE 1209 by. NVE 1206 may then perform traffic metering on the VN traffic directed towards NVE 1209 to ensure that VN traffic to NVE 1209 does not exceed the traffic rate limitations.

Figure 13:
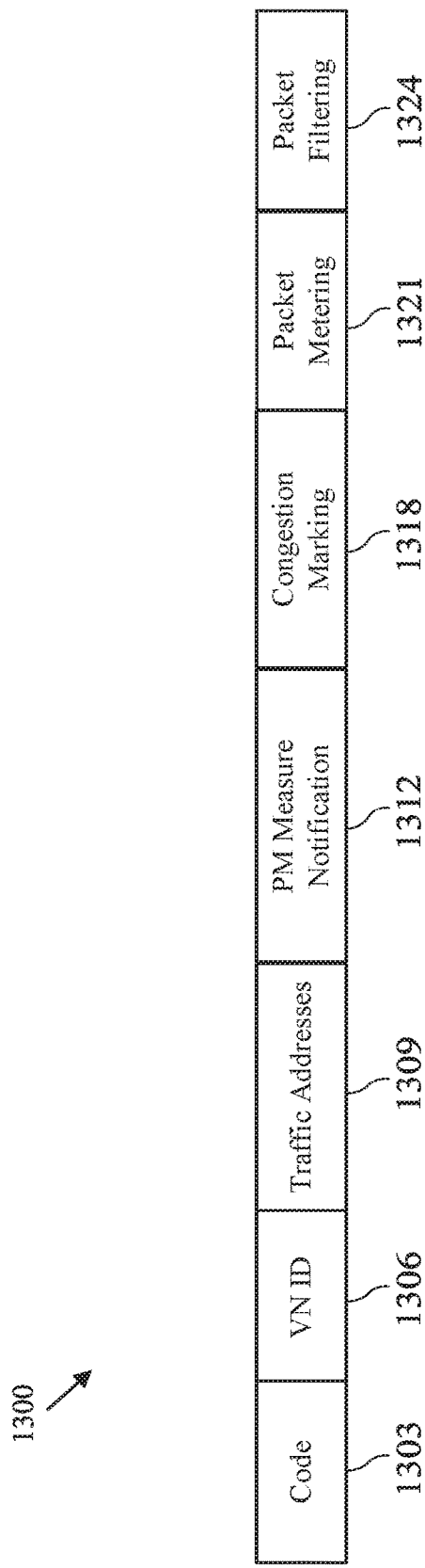
FIG. 13 illustrates an example embodiment of an operations message.

FIG. 13 illustrates an example embodiment of at least a portion of an enhanced ICMP operations message 1300. In an embodiment, the enhanced ICMP protocol module 450 generates the enhanced ICMP tunnel operations message 1300. For example, the Tx/Rx 420 is configured to send and receive the operations message 1300. The operations message 1300 may include a code 1303, a VNID 1306, traffic addresses 1309, a performance measurement (PM) measure notification 1312, a congestion marking 1315, packet metering 1321, and packet filtering 1324. As should be appreciated, the operations message 1300 may include additional operations that the sending NVE is requesting to be performed by the receiving NVE. The code 1303 identifies what operation the NVE sending the operations message 1300 is requesting the receiving NVE to perform. For example, different alphanumeric values included in code 1303 may indicate different operations. The VNID 1306 may be an identifier of the VN or VN instance of the NVEs transmitting and/or receiving the operations message 1300. The VNID 1306 may also be an identifier of an address family, such as, Ethernet, TRILL, MPLS/VPN, or other encapsulated traffic. Traffic addresses 1309 may be an IP, MAC, or MPLS address indicating a destination of the packets that are to be redirected. The VNID 1306 and the traffic addresses 1309 may pair up to express multiple VN traffic. The PM measure notification 1312 contains information regarding the packet loss, packet loss rate, delay, and/or jitter experienced by the sending and/or receiving NVE. The congestion markting 1315 indicates the level of congestion experienced by the sending and/or receiving NVE. The packet metering 1321 identifies a type of packet, a sender of the packet, and/or packet content that the requesting NVE wants the receiving NVE to meter. The packet metering 1324 identifies a certain type of packet, a certain sender of the packer, and/or certain packet content to filter such that the requesting NVE does not receive the filtered packets. For example, packet metering 1324 may include a condition in which packets that satisfy the condition for a specified period of time are to be metered. In an embodiment, the traffic addresses 1309, PM measure notification 1312, congestion marking 1318, packet metering 1321, and packet filtering 1324 use a type-length-value (TLV) format to encode the information in the message.

Figure 14:
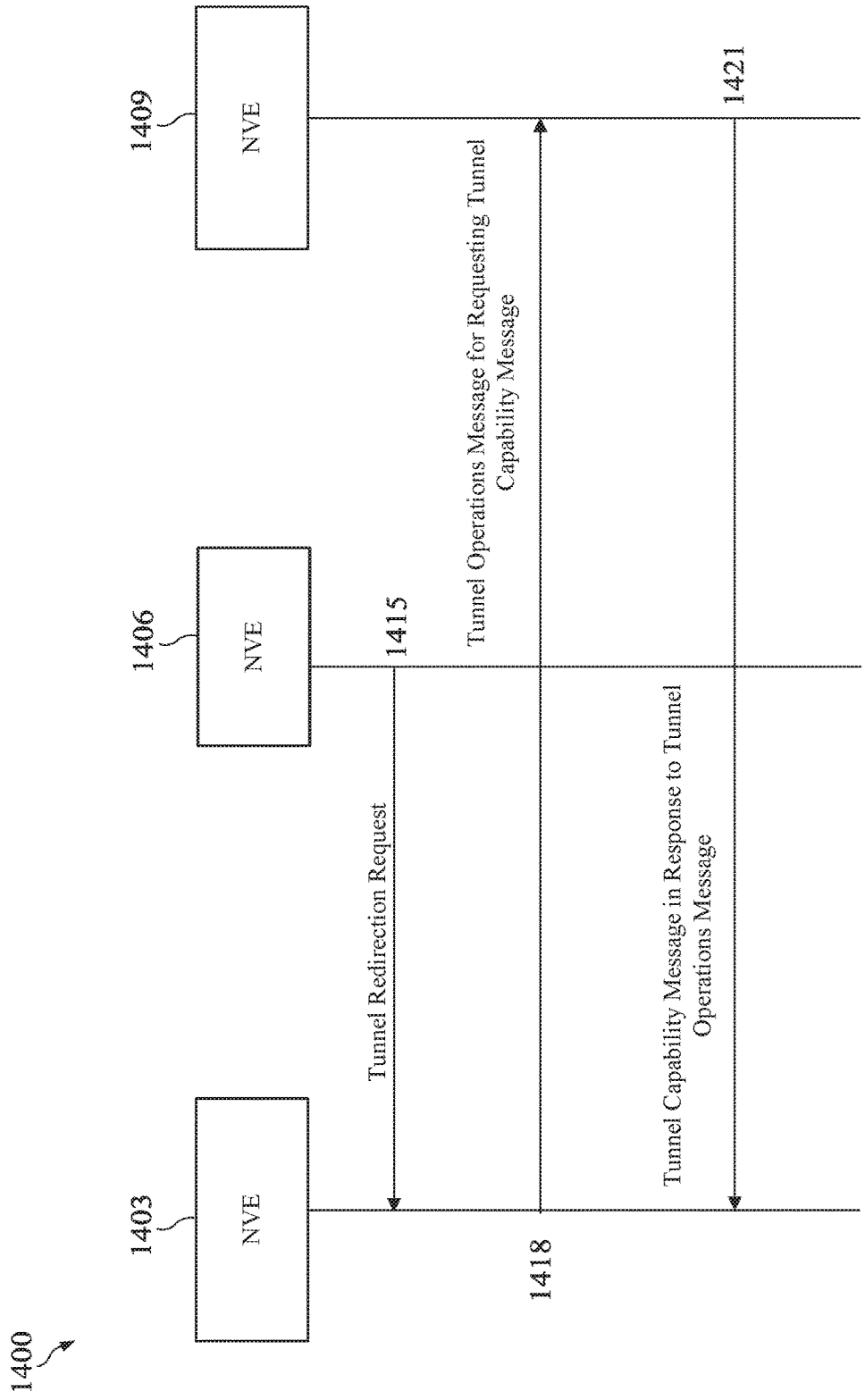
FIG. 14 is a message sequence diagram illustrating an example of how NVEs may send enhanced ICMP tunnel redirection request messages, capability messages, and operations messages.

FIG. 14 is a message sequence diagram 1400 illustrating an example of how NVEs 1403, 1406, and 1409 may send enhanced ICMP tunnel redirection request messages, capability messages, and operations messages. The steps shown in diagram 1400 are implemented when NVE 1403 receives packets and/or encapsulated packets from a TS, such as TS 110A-D. Diagram 1403 includes NVEs 1403, 1406, and 1409. In an embodiment, NVEs 1403, 1406, and 1409 are similar to NVEs 120A-B and NE 400. For example, the enhanced ICMP protocol module 450 executed by each of NVEs 1403, 1406, and 1409 may implement some or all of the steps in diagram 1400. NVEs 1403, 1406, and 1409 may communicate packets via a link in an underlying network and/or encapsulated packets via an overlay tunnel in an OVN. In an embodiment, the underlying network is similar to underlying network 130, and the overlay tunnel is similar to overlay tunnel 140. In an embodiment, the encapsulated packets are similar to encapsulated packets 220.

At step 1415, NVE 1406 transmits a tunnel redirection request message to NVE 1403. In an embodiment, the tunnel redirection request message is a request to redirect all IP traffic directed to a specified destination to go through NVE 1409 instead of NVE 1406 via an overlay tunnel. In an embodiment, the tunnel redirection request message is a request to redirect overlay traffic having the same VNID, IP prefix, and/or destination address as the VNID, IP prefix, and/or destination address indicated in the tunnel redirection request message to go through NVE 1409 instead of NVE 1406. In an embodiment, the tunnel redirection request message may be similar to tunnel redirection request message 900 or 950. At step 1418, NVE 1403 sends a tunnel operations message to NVE 1409 in response to getting the tunnel redirection request message from NVE 1406. The tunnel operations message may be a request to NVE 1409 to transmit a tunnel capability message to NVE 1403 such that NVE 1403 knows the properties and capabilities of NVE 1409 and a tunnel stitched between NVE 1403 and 1409. For example, the tunnel operations message may be similar to tunnel operations message 1300. In this way, NVE 1403 can control the transmission of overlay traffic to NVE 1409 to make sure that only overlay traffic that is compatible with the capabilities of NVE 1409 is sent to NVE 1409. At step 1421, NVE 1409 responds to the tunnel operations message by sending a tunnel capability message indicating the capabilities of NVE 1409 and/or capabilities of a tunnel between NVE 1403 and NVE 1409. For example, the tunnel capability message may be similar to tunnel capability message 1100.

Figure 15:
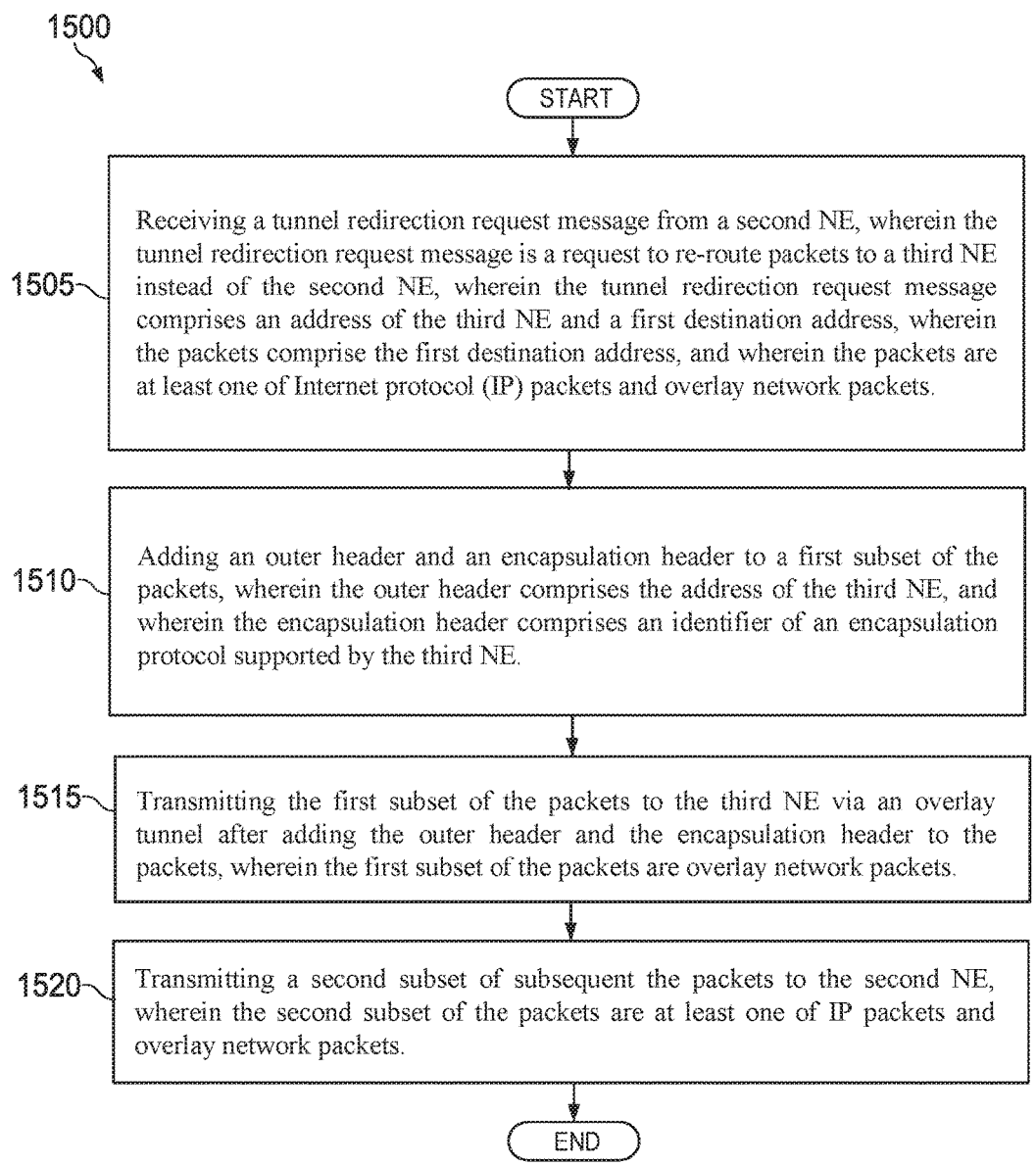
FIG. 15 is a flowchart of an example embodiment of a method 1500 implementing an enhanced ICMP protocol.

FIG. 15 illustrates a flowchart of an example embodiment of a method 1500 implementing an protocol. Method 1500 may be implemented by an NVE 120A-B or NE 400. Method 1500 may begin when packets are received at a first NE. At step 1505, a tunnel redirection request message is received from a second NE. For example, Tx/Rx 420 receives the tunnel redirection request message from the second NE. The tunnel redirection request message may be a request to re-route packets to a third NE instead of a second NE. The tunnel redirection request message may comprise an address of the third NE and a first destination address. The packets may comprise the first destination address. In an embodiment, the packets are at least one of IP packets and overlay network packets.

At step 1510, an outer header and an encapsulation header is added to a first subset of the packets. For example, processor 430 may encapsulate the first subset of subsequent packets by adding an outer header and an encapsulation header to each of the first set of subsequent packets. The outer header may comprise the address of the third NE. The encapsulation header may comprise an identifier of an encapsulation protocol supported by the third NE.

At step 1515, the first subset of the packets are transmitted to the third NE via an overlay network after adding the outer header and the encapsulation header to the packets. For example, Tx/Rx 420 may forward the encapsulated packets across the overlay tunnel 140 to the third NE. In an embodiment, the first subset of the packets are overlay network packets. At step 1520, a second subset of the packets are transmitted to the second NE. For example, Tx/Rx 420 may forward the second subset of subsequent packets across the overlay tunnel 140 to the second NE. The second subset of subsequent packets may comprise a second destination address. In an embodiment, the second subset of the packets are at least one of IP packets and overlay network packets.

As described above, the enhanced ICMP protocol for overlay networks facilitate overlay traffic transport that is simple and can be easily aligned with SDN architecture. Tunnel egresses use ICMP to redirect overlay traffic to new tunnel egresses or to inform tunnel properties and tunneled traffic properties. In this way, ICMP supports overlay, virtualization, and cloud applications. The systems and methods disclosed herein are compatible with SDN architecture. The systems and methods disclosed herein also enable users to establish or facilitate an overlay network or tunnel over the Internet, which is a benefit for cloud applications.

In an embodiment, the disclosure includes a method for providing communication over an overlay virtual network implemented by a first NE, comprising a means for receiving a tunnel redirection request message from at least one of a second NE and a network Controller, wherein the tunnel redirection request message is a request to re-route a first subset of subsequent packets to a third NE, wherein the tunnel redirection request message comprises an address of the third NE, and wherein the first subset of subsequent packets are overlay network packets, a means for encapsulating the first subset of subsequent packets to form a plurality of first encapsulated packets, wherein each the first encapsulated packets comprises a first outer header, and wherein the outer header comprises the address of the third NE, a means for forwarding the first encapsulated packets to the third NE via a first overlay tunnel, a means for encapsulating a second subset of subsequent packets to form a plurality of second encapsulated packets, wherein each of the second encapsulated packets comprises a second outer header, and wherein the second outer header comprises an address of the second NE, and a means for forwarding the second encapsulated packets to the second NE via a second overlay tunnel, wherein the second encapsulated packets are overlay network packets.

In another embodiment, the disclosure includes a first NE implemented as a NVE, comprising a means for receiving a tunnel redirection request message from a second NE or a network controller, wherein the tunnel redirection request message is a request to re-route a first subset of subsequent packets to a third NE, wherein the tunnel redirection request message comprises an address of the third NE, and wherein the first subset of subsequent packets are IP packets, a means for encapsulating the first subset of subsequence packets to form a plurality of encapsulated packets, wherein each of the encapsulated packets comprises an outer header, and wherein the outer header comprises the address of the third NE, a means for forwarding the encapsulated packets to the third NE, and a means for forwarding a second subset of subsequent packets to the second NE via a path of an IP network, wherein the second subset of subsequent packets are IP packets.

In another embodiment, the disclosure further includes a method for providing communication over a tunnel implemented by a first NE, comprising a means for receiving a tunnel redirection request message from a second NE, wherein the tunnel redirection request message is a request to re-route packets to a third NE, wherein the tunnel redirection request message comprises an address of the third NE, and wherein the packets are at least one of IP packets and overlay network packets, a means for adding an outer header to each of a first subset of the packets, wherein the outer header comprises the address of the third NE, a means for transmitting the first subset of the packets to the third NE via an overlay tunnel after adding the outer header to the packets, wherein the first subset of the packets are overlay network packets, and a means for transmitting a second subset of the packets to the second NE, wherein the second subset of the packets are at least one of IP packets and overlay network packets.

In another embodiment, the disclosure includes a first NE implemented as a NVE, comprising a means for receiving a tunnel operation message from a second NE via an overlay tunnel, wherein the tunnel operation message is a request for a plurality of capabilities and properties of the first NE, and a means for sending a tunnel capability message to the second NE in response to receiving the tunnel operation message via the overlay tunnel, wherein the tunnel capability message includes the capabilities and properties of the first NE.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for providing communication over an overlay virtual network implemented by a first network element (NE), comprising:
    receiving a tunnel redirection request message from a second NE, wherein the tunnel redirection request message is a request to re-route a first plurality of packets to a third NE instead of the second NE, wherein the tunnel redirection request message comprises an address of the third NE and a destination address, and wherein the first plurality of packets are overlay network packets;
    receiving the first plurality of packets comprising the destination address after receiving the tunnel redirection request message;
    encapsulating each of the first plurality of packets to include a first outer header and a first encapsulation header to form a plurality of first encapsulated packets in response to receiving the tunnel redirection request message and determining that the destination address in the first plurality of packets matches the destination address in the tunnel redirection request message, the first outer header comprising the address of the third NE, and the first encapsulation header indicating an encapsulation protocol supported by the third NE;
    forwarding the first encapsulated packets to the third NE via a first overlay tunnel;
    encapsulating a second plurality of packets to form a plurality of second encapsulated packets, wherein each of the second encapsulated packets comprises a second outer header, and wherein the second outer header comprises an address of the second NE; and
    forwarding the second encapsulated packets to the second NE via a second overlay tunnel, wherein the second encapsulated packets are overlay network packets.

2. The method of claim 1, further comprising establishing the first overlay tunnel between the first NE and the third NE.

3. The method of claim 1, wherein the first plurality of packets are transmitted via an overlay network, wherein the tunnel redirection request message further comprises a virtual network identifier (VNID) and a prefix, and wherein encapsulating the first plurality of packets further comprises setting the first outer header of the first plurality of packets to be the address of the third NE when the first plurality of packets comprise at least one of the VNID and the prefix.

4. The method of claim 1, further comprising receiving a tunnel capability message from the third NE, wherein the tunnel capability message comprises at least one of a tunnel encapsulation type supported by the third NE, a tunneled payload type of the third NE, a checksum capability of the third NE, and an offload capability of the third NE.

5. The method of claim 1, further comprising sending a tunnel operations message to the third NE, wherein the tunnel operations message identifies an operation for the third NE to perform.

6. The method of claim 1, wherein the first plurality of packets are encapsulated according to at least one encapsulation protocol consisting of virtual eXtensible Local Area Network (VXLAN), multiprotocol label switching (MPLS), user datagram protocol (UDP), generic UDP encapsulation (GUE), and service function chaining encapsulation (SFC).

7. A first network element (NE) implemented as a network virtualization edge (NVE), comprising:
a receiver configured to:
receive a tunnel redirection request message from a second NE, wherein the tunnel redirection request message is a request to re-route a first plurality of packets to a third NE instead of the second NE, wherein the tunnel redirection request message comprises an address of the third NE and a destination address, and wherein the first plurality of packets are overlay network packets; and
receive the first plurality of packets comprising the destination address after receiving the tunnel redirection request message;
a processor coupled to the receiver and configured to encapsulate each of the first plurality of packets to include a first outer header and a first encapsulation header to form a plurality of encapsulated packets in response to receiving the tunnel redirection request message and determining that the destination address in the first plurality of packets matches the destination address in the tunnel redirection request message, the first outer header comprising the address of the third NE, and the first encapsulation header indicating an encapsulation protocol supported by the third NE; and
a transmitter coupled to the processor and configured to:
forward the encapsulated packets to the third NE; and
forward a second plurality of packets to the second NE via a path of an IP network, wherein the second plurality of packets are IP packets.

8. The first NE of claim 7, further comprising sending a tunnel operations message to the third NE, wherein the tunnel operations message is a request for a tunnel capability message from the third NE.

9. The first NE of claim 8, wherein the tunnel capability message comprises at least one of a supported tunnel encapsulation type of the third NE, a tunneled payload type of the third NE, a checksum capability of the third NE, an offload capability of the third NE.

10. The first NE of claim 7, wherein the first plurality of packets are transmitted via an underlying network, and wherein the processor is further configured to:
identify the encapsulation protocol supported by the first NE and the third NE;
encapsulate the first plurality of packets according to the encapsulation protocol; and
establish the overlay tunnel between the first NE and the third NE.

11. The first NE of claim 7, wherein the first NE, the second NE, and the third NE are routers.

12. A method for providing communication over a tunnel implemented by a first network element (NE), comprising:
receiving a tunnel redirection request message from a second NE, wherein the tunnel redirection request message is a request to re-route a first plurality of packets to a third NE instead of the second NE, wherein the tunnel redirection request message comprises an address of the third NE and a destination address, and wherein the packets are overlay network packets;
receiving the first plurality of packets comprising the destination address after receiving the tunnel redirection request message;
adding an encapsulation header indicating an encapsulation protocol supported by the third NE to each of the first plurality of packets in response to receiving the tunnel redirection request message and determining that the destination address in the first plurality of packets matches the destination address in the tunnel redirection request message;
adding an outer header comprising the address of the third NE to each of the first plurality of packets in response to receiving the tunnel redirection request message and determining that the destination address in the first plurality of packets matches the destination address in the tunnel redirection request message;
transmitting the first plurality of packets to the third NE via an overlay tunnel after adding the outer header to the first plurality of packets, wherein the first plurality of packets are overlay network packets; and
transmitting a second plurality of packets to the second NE, wherein the second plurality of packets are at least one of IP packets and overlay network packets.

13. The method of claim 12, further comprising receiving a tunnel capability message from the third NE, wherein the tunnel capability message comprises properties of the third NE and properties of overlay traffic between the first NE and the third NE.

14. The method of claim 12, wherein each of the first plurality of packets includes a plurality of media access control (MAC) addresses of a tenant system to which the encapsulated packets are destined to.

15. The method of claim 12, wherein the address of the third NE is an Internet protocol (IP) address.

16. The method of claim 12, wherein the tunnel redirection request message comprises at least one of a code, a tunnel type, a tunnel egress address, a traffic IP address, a virtual network identifier (VNID), and a traffic address.

17. The method of claim 12, further comprising:
receiving a tunnel operations message from the third NE, wherein the tunnel operations message requests the first NE to filter packets of a certain type such that the third NE does not receive them; and
preventing the packets of the certain type from being forwarded to the third NE in response to receiving the tunnel operations message.

18. The method of claim 12, wherein the first plurality of packets are the IP packets and are transmitted via an underlying network, wherein the method further comprises establishing the overlay tunnel between the first NE and the third NE, and wherein the transmitter is further configured to forward the first plurality of packets to the third NE via the overlay tunnel.

19. The method of claim 12, wherein the first plurality of packets are the overlay network packets and are transmitted via an overlay network, wherein the tunnel redirection request message further comprises a virtual network identifier (VNID), and wherein the method further comprises setting the outer header of the first plurality of packets to be the address of the third NE when the first plurality of packets comprise the VNID.

20. The first NE of claim 12, further comprising storing a tunnel routing table and a tunnel properties table, wherein the tunnel routing table includes an entry for a tunneled path between a source tenant system and a destination tenant system, and wherein the tunnel properties table includes an entry identifying properties for each of the first NE, the second NE, and the third NE.

* * * * *